US006429965B1

(12) United States Patent
Falquier et al.

(10) Patent No.: US 6,429,965 B1
(45) Date of Patent: Aug. 6, 2002

(54) POLARIZATION AND WAVELENGTH STABLE SUPERFLUORESCENT SOURCES

(75) Inventors: Dario G. Falquier, Menlo Park; Michel J. F. Digonnet; H. John Shaw, both of Palo Alto, all of CA (US)

(73) Assignee: The Board of Trustees the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/429,049

(22) Filed: Oct. 29, 1999

Related U.S. Application Data

(60) Provisional application No. 60/106,709, filed on Nov. 2, 1998, provisional application No. 60/113,220, filed on Dec. 22, 1998, and provisional application No. 60/128,641, filed on Apr. 9, 1999.

(51) Int. Cl.[7] .................................................. H01S 3/00

(52) U.S. Cl. ........................................ 359/341.1; 372/6

(58) Field of Search ........................ 359/333, 341.1, 359/341.3, 337; 372/6, 27, 70, 341.33

(56) References Cited

U.S. PATENT DOCUMENTS

| | | | |
|---|---|---|---|
| 5,185,749 A | 2/1993 | Kalman et al. ................ | 372/6 |
| 5,355,216 A | 10/1994 | Kim et al. ..................... | 356/350 |
| 5,701,318 A | 12/1997 | Digonnet et al. .............. | 372/6 |
| 5,875,203 A | 2/1999 | Wagener et al. ............... | 372/6 |
| 5,949,930 A * | 9/1999 | Cordova et al. .............. | 385/27 |
| 6,031,646 A * | 2/2000 | Sniadower .................... | 359/160 |

FOREIGN PATENT DOCUMENTS

| | | |
|---|---|---|
| EP | 0 848 464 A2 | 6/1998 |

OTHER PUBLICATIONS

Katsumi Iwatsuki, Er–Doped Superfluorescent Fiber Laser Pumped by 1.48 μm Laser Diode, *IEEE Photonics Technology Letters*, vol. 2, No. 4, Apr. 1, 1999, pp. 237–238.

Douglas C. Hall, et al., High–Stability $Er^{3+}$–Doped superfluorescent Fiber Sources, *Journal of Lightwave Techology*, vol. 13, No. 7, Jul. 1995, pp. 1452–1460.

H.J. Patrick, et al., Erbium doped superfluorescent fibre source with long period fibre grating wavelength stabilisation, *Electronic Letters*, vol. 33, No. 24, Nov. 20, 1997, pp. 2061–2063.

PCT Search Report Jun. 15, 2000.

Konard Böhm, Klaus Petermann, and Edgar Weidel, Performance of Lyot Depolarizers with Birefringent Single–Mode Fibers, *Journal of Lightwave Technology*, vol. LT–1, No. 1, Mar. 1983, pp. 71–74.

Kazumasa Takada, Katsunari Okamoto and Masataka Nakazawa, New Fiber Optic Depolarizer, *Journal of Lightwave Technology*, vol. LT–4, No. 2, Feb. 1986, pp. 213–219.

(List continued on next page.)

Primary Examiner—Thomas H. Tarcza
Assistant Examiner—Deandra M. Hughes
(74) Attorney, Agent, or Firm—Knobbe, Martens, Olson & Bear, LLP

(57) ABSTRACT

The instability of the mean wavelength of a superfluorescent fiber source (SFS) is reduced by randomizing the polarization of light from a pump source or by using polarization maintaining components. In one embodiment, the polarization of a pump source is made more random, leading to greater stability of the mean wavelength of the SFS, with an output mean wavelength that is stable to better than 3 ppm for full rotation of the pump polarization state. In another embodiment, the polarization of optical radiation throughout the device is kept substantially constant by using polarization maintaining fiber and components, thereby leading to enhanced mean wavelength stability of the SFS.

45 Claims, 27 Drawing Sheets

OTHER PUBLICATIONS

A. D. Kersey, and A. Dandridge, Monomode Fibre Polarization Scrambler, *Electronics Letters*, vol. 23, No. 12, 4th Jun. 1987, pp. 634–636.

Emmanuel Desurvire and Jay R. Simpson, Amplification of Spontaneous Emission in Erbium–Doped Single–Mode Fibers, *Journal of Lightwave Technology*, vol. 7, No. 5, May 1989, pp. 835–845.

Kazunori Suzuki, Yasuo Kimura and Masataka Nakazawa, An 8 mW cw $Er^{3+-}$ Doped Fiber Laser Pumped by 1.46 PLUS CODE 89 IS NOT DEFINEDm InGaAsP Laser Diodes, *Japanese Journal of Applied Physics*, vol. 28, No. 6, Jun. 1989, pp. L1000–L1002.

D. G. Falquier, J. L. Wagener, M. J. F. Digonnet, and H. J. Shaw, Highly efficient polarized Er–Doped superfluorescent fiber source, *SPIE*, vol. 2841, Aug. 1996, pp. 35–41.

Jefferson L. Wagener, Erbium Doped Fiber Sources and Amplifiers for Optical Sensors, Stanford University Ph.D. Thesis, Mar. 1996, pp. 1–150.

D. G. Falquier, J. L. Wagener, M. J. F. Digonnet, and H. J. Shaw Basis for a polarized superfluorescent fiber source with increased efficiency, *Optics Letters*, Dec. 1, 1996, vol. 21, No. 23, pp. 1900–1901.

D. G. Falquier, J. L. Wagener, M. J. F. Digonnet, and H. J. Shaw, Polarized superfluorescent fiber source, *Optics Letters*, vol. 22, No. 3, Feb. 1, 1997, pp. 160–162.

Jefferson L. Wagener, Michel J. F. Digonnet, and Herbert J. Shaw, A High–Stability Fiber Amplifier Source for the Fiber Optic Gyrosocpe, *Journal of Lightwave Technology*, vol. 15, No. 9, Sep. 1997, pp. 1689–1694.

D. G. Falquier, J. L. Wagener, M. J. F. Digonnet, and H. J. Shaw, Polarized Superfluorescent Fiber Sources, *Optical Fiber Technology*, vol. 4, Oct. 1998, pp. 453–470.

D. G. Falquier, M. J. F. Digonnet, G. S. Kino, and H. J. Shaw, Polarization dependence of the mean wavelength of Er–doped superfluorescent fiber sources, *SPIE*, vol. 3542, Nov. 1998, pp. 26–29),.

Jefferson L. Wagener, Dario G. Falquier, Michel J. F. Digonnet, and Herbert J. Shaw, A Muelle Matrix Formalism for Modeling Polarization Effects in Erbium–Doped Fiber, *Journal of Lightwave Technology*, vol. 16, No. 2, Feb. 1998, pp. 200–206.

Weik, Martin, Fiber Optics Standard Dictionary, 1997, Chapman & Hall, 3rd Edition, p. 761.*

* cited by examiner

POLARIZATION AND WAVELENGTH STABLE SUPERFLUORESCENT SOURCES

The present application claims the benefit of the following provisional applications, all of which are hereby incorporated by reference herein: Application No. 60/106,532 filed Oct. 31, 1998, Application No. 60/106,709 filed Nov. 2, 1998, Application No. 60/113,220 filed Dec. 22, 1998, and Application No. 60/128,641 filed Apr. 9, 1999.

BACKGROUND OF THE INVENTION

1. Field of the Invention

The present invention relates to fiber amplified spontaneous emission (ASE) light sources, and more particularly, to superfluorescent fiber sources that have a stable mean wavelength with respect to changes in pump polarization.

2. Description of the Related Art

Fiber ASE light sources are well known in the art. ASE sources have been advantageously used to provide wideband (e.g., on the order of 10 to 30 nanometers), spatially coherent light for multiple applications. For example, ASE sources have been used to provide laser light as an input to a fiberoptic gyroscope. For a description of an exemplary superfluorescent fiber source, see an article entitled "Amplification of Spontaneous Emission in Erbium-Doped Single-Mode Fibers" by Emmanuel Desurvire and J. R. Simpson, published by *IEEE*, in "Journal of Lightwave Technology," Vol. 7, No. May 5, 1989.

An ASE light source typically comprises a length of single-mode fiber, with a portion of its cross-section (typically the core) doped with an ionic, trivalent rare-earth element. For example, neodymium ($Nd^{3+}$) and erbium ($Er^{3+}$) are rare-earth elements that may be used to dope the core of a single-mode fiber so that it acts as a laser medium.

The fiber receives a pump input signal at one end. The pump signal is typically a laser signal having a relatively narrow spectrum centered around a wavelength $\lambda_p$. The ions within the fiber core absorb the input laser radiation at wavelength $\lambda_p$ so that electrons in the ground state of these ions are excited to a higher energy state of the ions. When a sufficient pump power is input into the end of the fiber, a population inversion is created (i.e., more electrons within the ions are in the excited state than are in the lower laser state), and a significant amount of fluorescence is generated along the length of the fiber. As is well known, the fluorescence (i.e., the emission of photons at a different wavelength $\lambda_s$) is due to the spontaneous return of electrons from the excited state to the lower laser state so that a photon at a wavelength $\lambda_s$ is emitted during the transition from the excited state to the ground state. These photons are amplified by the gain as they travel down the fiber, leading to amplified spontaneous emission (ASE). The light which is emitted at the wavelength $\lambda_s$ from the fiber is highly directional light, as in conventional laser light. However, one main characteristic of this emission which makes it different from that of a traditional laser (i.e., one which incorporates an optical resonator) is that the spectral content of the light emitted from the superfluorescent fiber source is generally very broad (typically several tens of nanometers). This principle is well known in laser physics, and has been studied experimentally and theoretically in silica-based fibers doped with erbium, neodymium, or other rare earths, for several years.

Light emitted from ASE fiber sources has multiple applications. For example, in one application, the output of the ASE source is fed into a fiberoptic gyroscope. For reasons that are well understood by those skilled in the art, the fiberoptic gyroscope should be operated with a broadband source which has a highly stable mean wavelength. Of the several types of broadband sources known to exist, superfluorescent fiber sources, in particular, made with erbium-doped fiber, have been thus far the only optical sources which meet the stringent requirements for inertial navigation grade fiberoptic gyroscopes. The broad bandwidth of light produced by erbium-doped fiber sources, together with the low pump power requirements and excellent mean wavelength stability of erbium-doped fiber sources, are the primary reasons for use of such sources with fiberoptic gyroscopes.

In an erbium-doped fiber, the emission of a superfluorescent fiber source is bi-directional. That is, the light which is emitted by the return of electrons to the ground state in the erbium ions is typically emitted out of both ends of the fiber. As described in U.S. Pat. No. 5,185,749, to Kalman, et al., for erbium-doped fibers of sufficient length, the light propagated in the backward direction (i.e., in the direction opposite that in which the pump signal propagates) has a very high efficiency. Thus, it is advantageous to implement erbium-doped sources so that the light emitted from the ASE erbium-doped source is emitted from the pump input end of the fiber (i.e., in the backward propagation direction).

An ASE source is generally implemented in one of two configurations. In a first configuration, called a single-pass ASE source, the superfluorescent source output power is emitted in two directions, one of which is not used. In the second configuration, called a double-pass ASE source, a reflector is placed at one end of the doped fiber to reflect the superfluorescent source signal so that the superfluorescent signal is sent a second time through the fiber. Since the fiber exhibits gain at the superfluorescent signal wavelengths, the ASE signal is further amplified. One advantage of the double-pass configuration is that it produces a stronger signal. A double-pass ASE source configuration also produces output only at one port (i.e., in one direction). A disadvantage of such a configuration is that the feedback optical signal from the gyroscope must be kept very low in order to prevent lasing (e.g., with use of an optical isolator located between the source and the gyroscope).

For fiberoptic gyroscope applications, one critical measure of source performance is the stability of the source mean wavelength (for example, see U.S. Pat. No. 5,355,216 to Kim, et al.). As is well known in the art, stability of the source mean wavelength leads directly to the stability of the gyroscope scale factor. Precise knowledge of the scale factor is critical for an accurate measurement of the rotation rate of the gyroscope. Presently, superfluorescent fiber sources exist which have a mean wavelength stability with respect to pump power, pump wavelength, temperature, and level of optical feedback down to a few parts per million each, assuming reasonable stabilization of system parameters such as pump wavelength, pump power, temperature and optical feedback from the gyroscope. However, an overall stability of better than one part per million in mean wavelength is desirable for some applications, in particular, high-grade fiberoptic gyroscopes.

Polarization effects have recently been shown to play a role in the instability of the mean wavelength of superfluorescent fiber sources (SFS). The polarization dependence of the mean wavelength of an SFS output has been predicted through numerical modeling by J. L. Wagener, et al. [see J. L. Wagener, "Erbium doped fiber sources and amplifiers for optical sensors," Ph.D. thesis, Applied Physics Department, Stanford University (March 1996); J. L. Wagener, M. J. F. Digonnet, and H. J. Shaw, "A High-Stability Fiber Amplifier Source for the Fiber Optic Gyroscope," *J. Lightwave Technol.* Vol. 15, 1689–1694 (Sep. 1997); and J. L. Wagener, D. G. Falquier, M. J. F. Digonnet, and H. J. Shaw, "A Mueller Matrix Formalism for Modeling Polarization Effects in Erbium-Doped Fiber," *J. Lightwave Technol.* Vol. 16, 200–206 (February 1998), which are hereby incorporated by reference herein]. These studies have shown that the mean wavelength of the SFS depends slightly on pump polarization. The reason for this can be explained in physical terms as follows. The ions of erbium (or another dopant, such as Nd or another rare earth) in the fiber host experience an intrinsic anisotropy of absorption and emission with respect to polarization. For example, some erbium ions more strongly absorb a given polarization than others, and correspondingly, these erbium ions have a preferred polarization associated with their emission. This effect gives rise to polarization-dependent gain when the erbium-doped fiber is pumped in the usual manner, i.e., by a highly polarized source such as a laser diode. This in turn can result in orthogonal polarization components of the output ASE signal having different mean wavelengths.

SUMMARY OF THE INVENTION

A first embodiment of the invention is a superfluorescent source that includes an optical pump source that generates optical radiation that is substantially unpolarized and an optically active solid state medium (e.g., a solid state laser medium) that is pumped by the substantially unpolarized optical radiation. The medium has characteristics selected to generate superfluorescence having a full width at half maximum (FWHM) of at least 2 nm and a mean wavelength that is stable to within 50 ppm against (i.e., even in the presence of) polarization fluctuations in the superfluorescent source. In one preferred embodiment, the superfluorescence has a mean wavelength that is stable to within 3 ppm in the presence of polarization fluctuations in the superfluorescent source. In a preferred embodiment, the mean wavelength is stable to within 50 ppm in the presence of birefringence changes in the superfluorescent source. In one preferred embodiment, the mean wavelength is stable to within 50 ppm in the presence of polarization changes of the optical radiation from the optical pump source.

Another embodiment of the invention is a superfluorescent source that includes an optical pump source that generates optical radiation that is substantially unpolarized and an optically active solid state medium (e.g., laser medium) that is pumped by the substantially unpolarized optical radiation. The medium has characteristics selected to generate superfluorescence having a full width at half maximum (FWHM) of at least 2 nm and a mean wavelength that is stable to within 50 ppm even in the presence of polarization changes in the source that range over the Poincaire sphere.

Yet another embodiment is a superfluorescent source that includes an optical pump source that generates optical radiation that is substantially unpolarized. The optical pump source includes a plurality of pumps that generate respective optical outputs, a polarization mixer that receives the respective optical outputs from the plurality of pumps and generates optical output (in which the respective optical outputs from the plurality of pumps have polarizations selected such that optical output from the mixer is substantially unpolarized), and a depolarizer that receives the optical output from the polarization mixer. The embodiment further includes an optically active solid state medium (e.g., laser medium) that is pumped by the output from the depolarizer, in which the medium has characteristics selected to generate superfluorescence having a full width at half maximum (FWHM) of at least 2 nm and a mean wavelength that is stable in the presence of polarization fluctuations in the superfluorescent source. In a preferred embodiment, the superfluorescent source has a mean wavelength that is stable to within 500 ppm in the presence of polarization fluctuations in the superfluorescent source. In a more preferred embodiment, the mean wavelength is stable to within 100 ppm in the presence of polarization fluctuations in the superfluorescent source. In a still more preferred embodiment, the mean wavelength is stable to within 50 ppm in the presence of polarization fluctuations in the superfluorescent source. In a most preferred embodiment, the mean wavelength is stable to within 3 ppm in the presence of polarization fluctuations in the superfluorescent source. In one preferred embodiment, the plurality of pumps includes two pumps having respective optical outputs whose polarizations are combined so that their polarizations are orthogonal to each other. In a preferred embodiment, the mean wavelength is stable to within 500 ppm in the presence of birefringence changes in the superfluorescent source. In one preferred embodiment, the mean wavelength is stable to within 500 ppm in the presence of polarization changes of the optical radiation from the optical pump source.

Yet another preferred embodiment is a method of generating superfluorescence, which includes providing a plurality of optical pumps having respective optical outputs with different polarizations, directing the respective optical outputs through a polarization mixer that produces optical output (in which the different polarizations are selected so that the optical output from the mixer is substantially unpolarized), depolarizing the output from the mixer, injecting the depolarized output into an optically active solid state medium (e.g., laser medium), and producing superfluorescence from the medium that has a mean wavelength that is stable in the presence of polarization fluctuations in the superfluorescent source. In a preferred embodiment, the wavelength is stable to within 500 ppm in the presence of polarization fluctuations in the superfluorescent source. In a preferred embodiment, the plurality of optical pumps includes two pumps having respective optical outputs combined so that their polarizations are orthogonal to each other.

Yet another embodiment is a method of generating superfluorescence, comprising providing an optically active medium (e.g., laser medium) having first and second ends, pumping the first end of the medium with optical output from a first optical pump (in which the output from the first optical pump has a first power and a first polarization), and pumping the second end of the medium with optical output from a second optical pump (in which the output from the second optical pump has a second power and a second polarization different from the first polarization). The method further includes producing optical output from the first end of the medium that comprises a first spectral component having a first mean wavelength and a polarization parallel to the first polarization, and a second spectral component having a second mean wavelength and a polarization orthogonal to the first polarization. The method also includes selecting the first pump power and the second pump power so as to substantially reduce the polarization dependent gain that would be present if the first power were equal to the second power, so that the difference between the mean wavelength of the first spectral component and the mean wavelength of the second spectral component is substantially reduced. In a preferred embodiment, the first polarization and the second polarization are orthogonal. In one preferred embodiment, the second power is selected to be less than the first power.

Another embodiment of the invention is a device that includes an optical pump that produces polarized optical output. The source further includes an optically active, solid state medium (e.g., laser medium) that receives the polarized optical output, in which the medium has birefringence axes that receive equal amounts of pump power to reduce polarization dependent gain effects within the medium. The medium produces optical output that has substantially the same mean wavelength for all polarization. The device further includes a fiber optic gyroscope that receives the optical output from the medium.

Yet another embodiment of the invention is a method of generating superfluorescent optical output that includes outputting a polarized optical signal from a pump source (in which the polarized optical signal has a polarization axis), inputting the polarized optical signal into an optically active, solid state medium (e.g., laser medium) that has birefringence axes, and orienting the birefringence axis of the solid state medium at about 45 degrees with respect to the polarization axis of the polarized optical output to reduce polarization dependent gain effects within the medium such that the solid state medium produces a superfluorescent optical output that has substantially the same mean wavelength for all polarizations.

Still another embodiment of the invention is a method of generating superfluorescent output from a superfluorescence source that includes providing an optical pump which generates optical output and directing the optical output into a polarization mixer which generates a first output signal and a second output signal (in which the two output signals having respective intensities and different polarizations). The first output signal is directed into a first end of a optically active solid state medium (e.g., laser medium), and the second output signal is directed into a second end of the optically active solid state medium. Optical gain is produced in the solid state medium that is substantially independent of polarization to generate optical output from one end of the solid state medium whose mean wavelength is stable even in the presence of polarization fluctuations in the superfluorescent source. In a preferred embodiment, the gain that is substantially independent of polarization is produced by selecting the intensities of the first and second output signals.

BRIEF DESCRIPTION OF THE DRAWINGS

FIGS. 4A, 4B, 4C, and 4D, presents data showing the variations in the mean wavelength of a superfluorescent fiber source as polarization is varied for the experimental setups of FIGS. 5 and 9B.

DETAILED DESCRIPTION OF THE PREFERRED EMBODIMENTS

The present invention is described below in connection with optical waveguides in the form of optical fibers. It should be understood that other types of optical waveguides can be advantageously substituted for the optical fibers in many of the embodiments described herein. The term "solid state" as used herein includes optical waveguides such as optical fibers.

The intrinsic anisotropy of erbium ions in a host such as silica and the high degree of polarization of a laser pump source result in polarization-dependent gain. Although this effect is small, it has significant deleterious effects in optical communication systems utilizing multiple erbium-doped fiber amplifiers, and, for these applications, the polarization dependence of the gain should be reduced. Polarization-dependent gain may also play a deleterious role in a superfluorescent fiber source. The reason is that the mean wavelength of the source is affected, through polarization-dependent gain, by the pump polarization. Typically, the rotation sensing coil within a fiber optic gyroscope is preceded (in the optical path sense) by a polarizer. Thus, if the polarization of the pump entering the erbium-doped fiber drifts as a result of environmental changes (changes in the fiber birefringence induced by variations in temperature, or variations in the orientation of the fiber, will change the state of polarization (SOP) of the light in the erbium-doped fiber), the mean wavelength entering the gyro coil varies, as does the gyro scale factor. As discussed earlier, such effects are highly undesirable in fiber optic gyroscope (FOG) applications, in particular in high-grade gyros, in which an SFS source with mean wavelength variations under one part per million (ppm) is required.

It is one object of this invention to reduce the instability of the mean wavelength of a superfluorescent fiber source (SFS). In one embodiment of the invention, the polarization of a pump source of a superfluorescent fiber source is made more random, leading to greater stability of the mean wavelength of the SFS. Using one or more depolarizers at the output of the pump source as well as at other locations in the SFS dramatically reduces the SFS output spectrum dependence on polarization, so that polarization drift of the pump, or the superfluorescence (e.g., due to changes in the birefringence of optical components in the SFS), or both, are inconsequential. In another embodiment of the invention, the polarization of optical radiation throughout the device is kept substantially constant by using polarization-maintaining fiber and components, thereby leading to enhanced mean wavelength stability of the SFS. Using polarization-maintaining components does not produce fully unpolarized output, but this is unimportant to the source stability because the dependence on pump polarization is removed by eliminating polarization drifts altogether.

Figure 1:
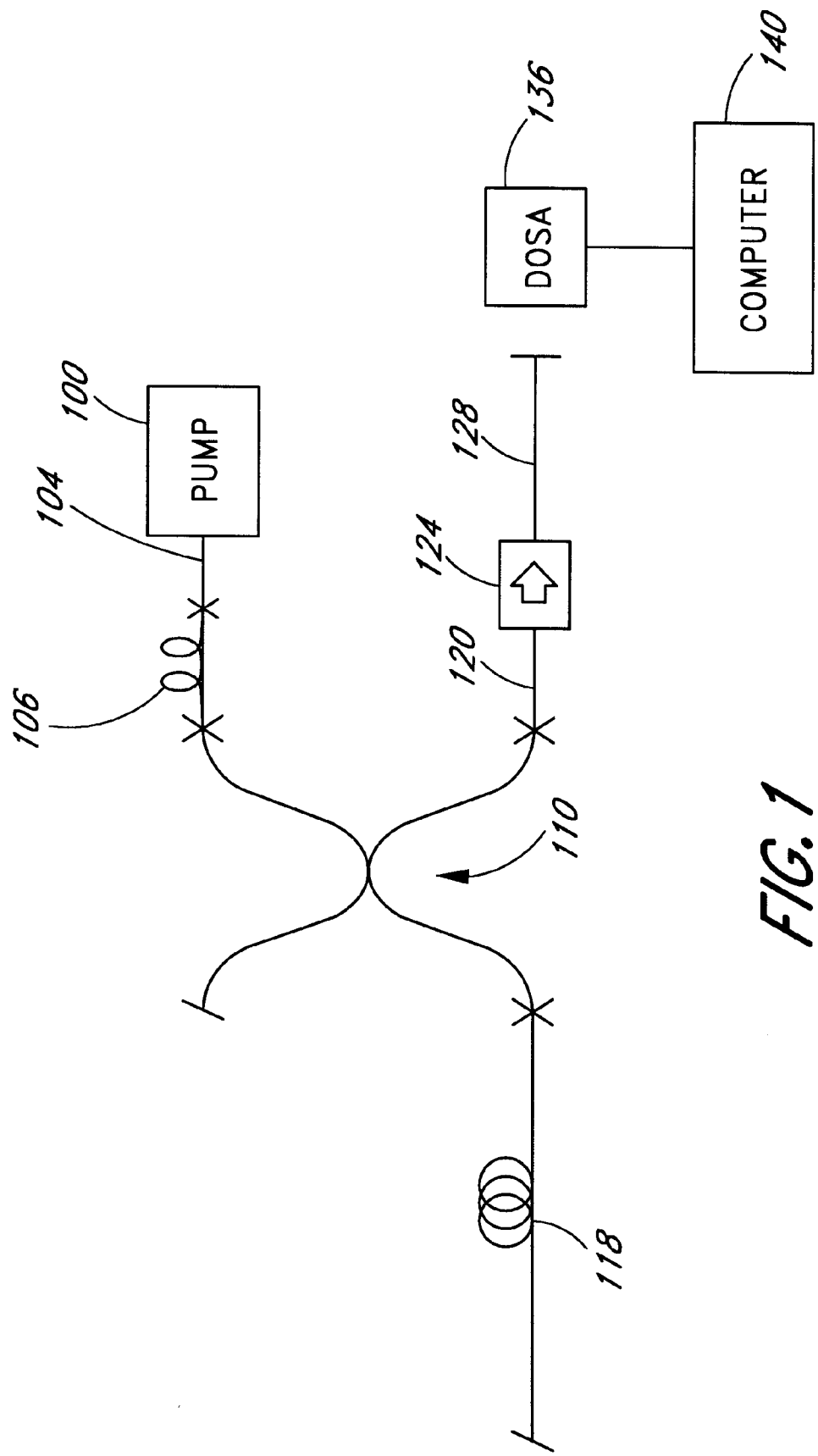
FIG. 1 shows an experimental setup for investigating the variations in the mean wavelength of a superfluorescent fiber source as the polarization of the optical pump is varied with a polarization controller located at the output end of the optical pump.

Experimental data related to a first embodiment of the invention are collected using the setup shown in FIG. 1. An optical pump source 100 such as a laser diode has an output pigtail 104 spliced to a polarization controller 106 that is spliced to an optical coupling element 110 such as a wavelength division multiplexing (WDM) fiber coupler. The optical pump source 100 may alternatively comprise one or more light emitting diodes (LEDs). The WDM coupler 110 is in turn spliced to a doped optical fiber 118 capable of producing optical output in the form of superfluorescent light. The optical fiber 118 is preferably an Er-doped fiber of silicon dioxide. (In the embodiments disclosed herein, other rare earths such as neodyrnium may also be used.) For the results reported here, the fiber is 15 meters in length and its small-signal absorption is 12 dB/m at 1480 nm and 27 dB/m at 1530 nm. The WDM coupler 110 is further spliced to an input pigtail 120 of an isolator 124, which has an output pigtail 128 that directs the optical output from the fiber 118 to a combination depolarizer/optical spectrum analyzer (DOSA) 136. The isolator 124 prevents unwanted optical feedback from the DOSA 136 from affecting the spectrum of the superfluorescence emitted by the doped fiber 118.

For the purpose of this measurement, it is important that the optical spectrum analyzer (OSA) exhibit no polarization dependence, i.e., that if different polarizations of the same spectrum of light are fed into the OSA, the spectra read and supplied by the OSA are the same. However, the OSA used for this measurement exhibited some polarization dependence, i.e., it acted as a polarization-independent OSA preceded by a frequency-dependent partial polarizer. To eliminate this undesirable property, a fiber depolarizer was placed in front of the OSA. The fiber depolarizer, as described below, was made of two lengths of high-birefringence fiber spliced together at a 45° angle. The first fiber length was 1.5 meters, and the second fiber length was 3 meters. When the polarization of spectrally broad light fed into the DOSA 136 is changed, the spectrum read by the DOSA remains unchanged, so that the DOSA acts as a polarization-independent instrument.

As indicated in FIG. 1, the superfluorescent output signal emerging from the Er-doped fiber 118 passes through the isolator 124 before being detected by the DOSA 136. Digitized output from the DOSA 136 can be recorded and displayed by a computer 140 which calculates spectrum statistics, and in particular, calculates the mean wavelength of the spectrum. The data acquisition rate was selected such that this setup scans and displays a new spectrum, then calculates and displays its mean wavelength, once every few seconds. The setup of FIG. 1 thus comprises a backward SFS pumping arrangement in which the mean wavelength of the spectral output can be monitored over time.

Figure 2:
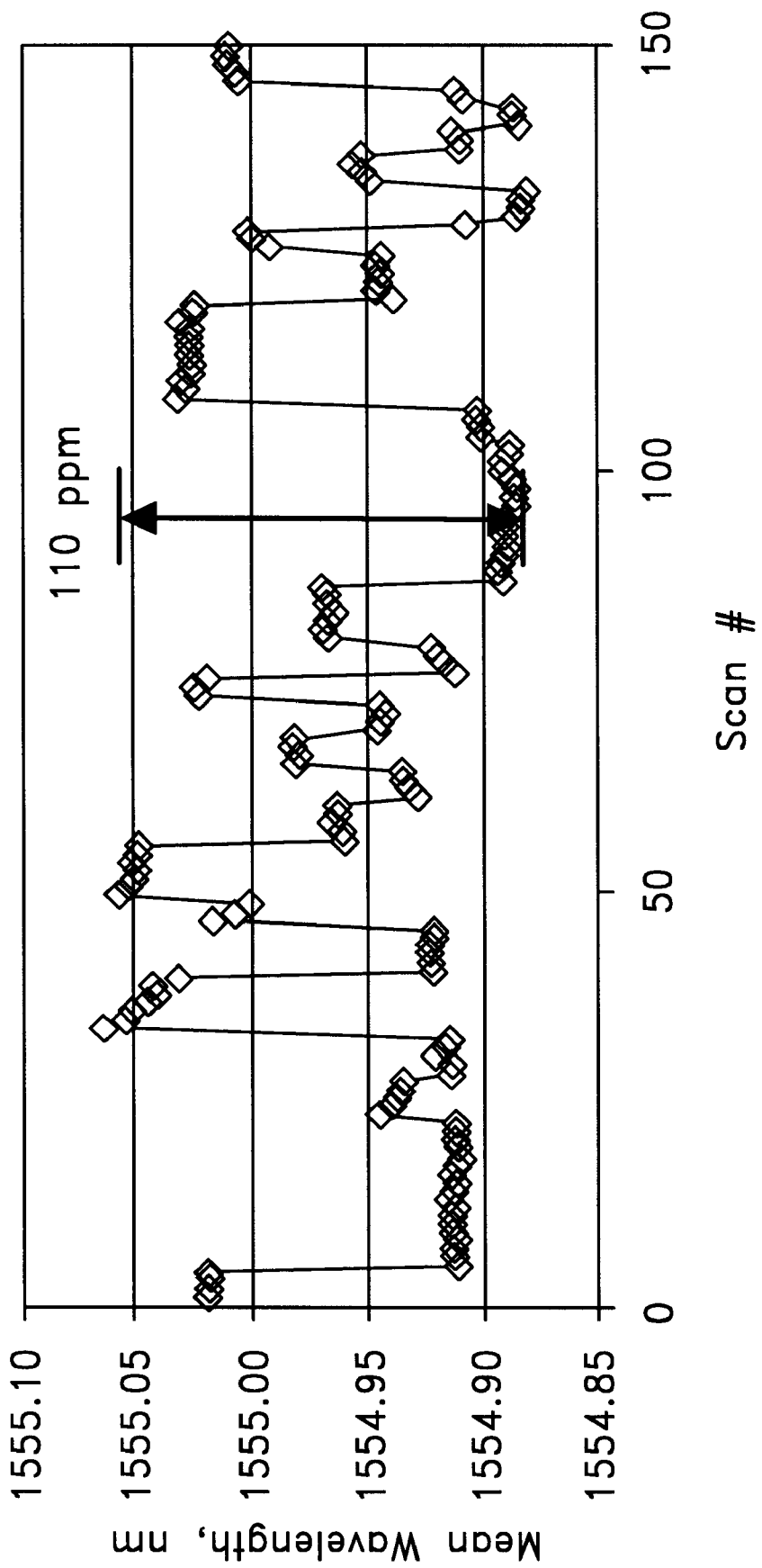
FIG. 2 presents data collected with the setup shown in FIG. 1.

FIG. 2 shows data collected with the setup of FIG. 1, in which the SFS mean wavelength is plotted against scan number. Before taking each data point in the plot, the polarization controller 106 was adjusted so that a different polarization of the pump radiation entered the doped fiber 118. The polarization controller 106 was thus adjusted repeatedly to provide substantially all possible pump polarization states (or all points on the Poincaire sphere). However, the polarization controller 106 was not necessarily varied in a regular, systematic way by, for example, changing the polarization by a fixed amount from scan to scan. Thus, the mean wavelengths are not expected to exhibit any trend with scan number.

The observed range in mean wavelength relative variations (i.e., $\Delta\lambda/\lambda$) in FIG. 2 is approximately 110 ppm, which is much larger than the mean wavelength stability required for a high-grade fiber optic gyroscope, which is preferably <1 ppm. Thus, even if the state of polarization of the light entering the fiber 118 were to change by only a relatively small fraction, the SFS mean wavelength would still vary by an amount substantially greater than 1 ppm. Such changes can easily occur over long time periods (an hour or more), e.g., changes in the environment can alter the birefringence of any portion of the optical link between the pump source 100 and the far end of the erbium-doped fiber 118, such as the output pigtail 104, the WDM coupler 110, and the erbium-doped fiber 118. Accordingly, environmental factors can produce a slow drift in the SFS mean wavelength, making the apparatus of FIG. 1 unsuitable for use in systems requiring a highly stable mean wavelength.

Figure 3:
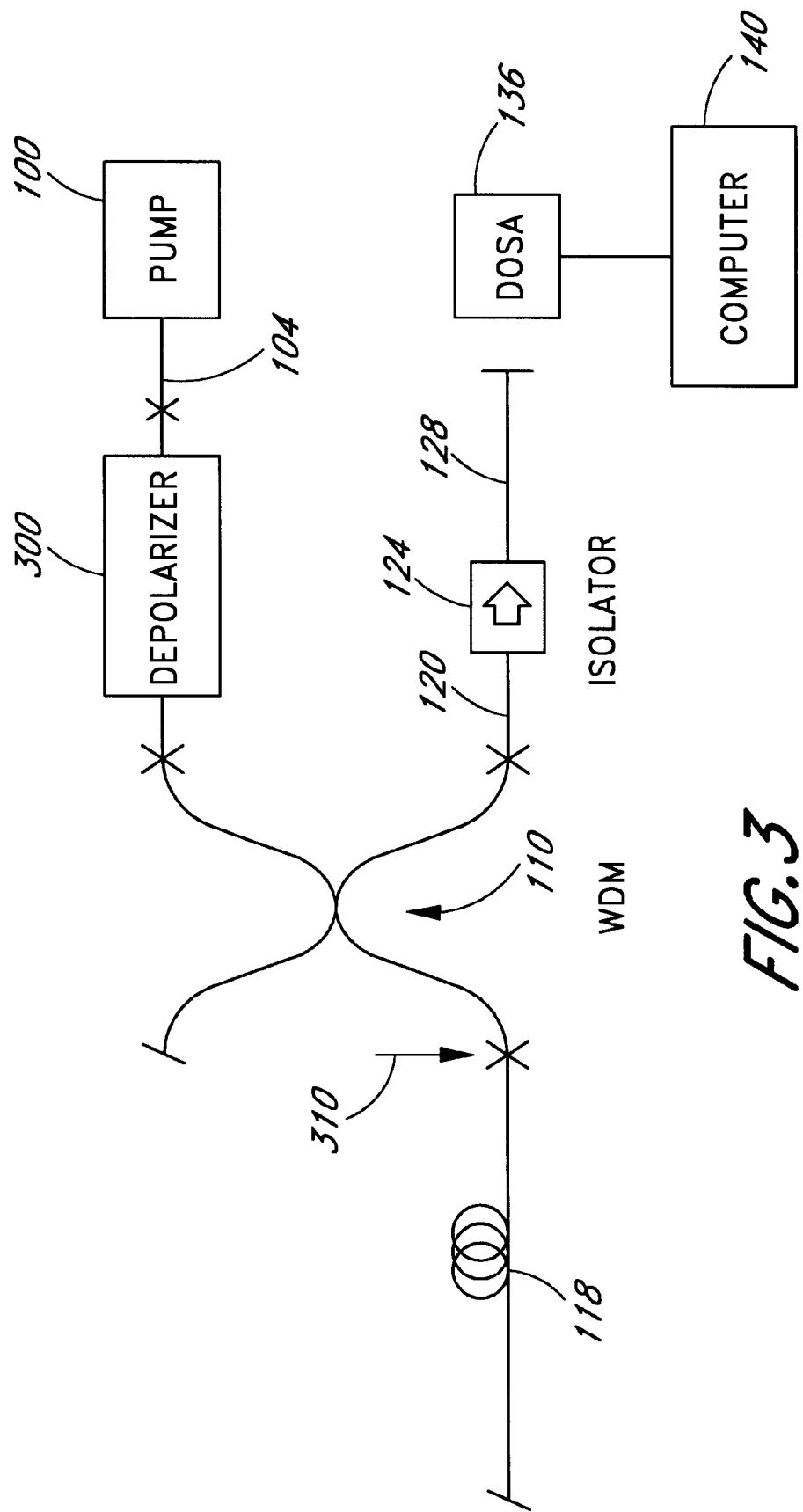
FIG. 3 shows an experimental setup similar to that of FIG. 1, except that a depolarizer is used at the output end of the optical pump.

In accordance with a first embodiment of the present invention, the polarization controller 106 shown in FIG. 1 is replaced by a depolarizer 300, as illustrated in FIG. 3. As is well known in the art, a depolarizer is a device that randomizes the state of polarization of a light source by, for example, scrambling its polarization rapidly over time. Alternatively, a depolarizer may give different states of polarization to different frequency components of an optical source, so that the light is no longer characterized by a single state of polarization, but rather, the polarization is a strong function of wavelength.

The WDM coupler 110 of the embodiment shown in FIG. 3 advantageously has a coupling ratio and a loss that are independent of polarization, so that depolarized pump light from the depolarizer 300 is still depolarized where it enters the erbium-doped fiber 118. As a result, polarization-dependent gain within the fiber 118 is greatly reduced, and the output of the superfluorescent optical fiber 118 (at the point indicated by the arrow 310) is unpolarized. In other words, if an additional polarizer (not shown) were inserted between the isolator 124 and the OSA 136, the output spectrum at the OSA would be substantially identical for all rotational orientations of this additional polarizer, assuming that the transmission of the isolator 124 from left to right is independent of polarization.

The depolarizer 300 may comprise a number of depolarizers known in the art, including, but not limited to, a polarization scrambler (e.g., a fast PZT modulator) and a Lyot depolarizer. Other kinds of depolarizers are discussed in the literature. (See, for example, A. D. Kersey, and A. Dandridge, "Monomode fibre polarization scrambler," *Electron. Lett.* Vol. 23, 634–636, June 1987; and K. Takada, K. Okamota, and J. Noda, "New fiber-optic depolarizer," *J. Lightwave Technol.* Vol. 4, 213–219, February 1986, which discusses a Mach-Zehnder interferometer with a delay line). In its simplest form, a PZT-based depolarizer may comprise a PZT ring about which is wound an optical fiber. A voltage applied to the ceramic ring is rapidly modulated, causing the size of the ring to vary, so that when the polarization of light is properly aligned with the PZT ring, the polarization of the light propagating through the optical fiber varies with time. A PZT depolarizer suitable for depolarizing an arbitrary input polarization may advantageously comprise two PZT rings that are orthogonal to each other.

Figure 4:
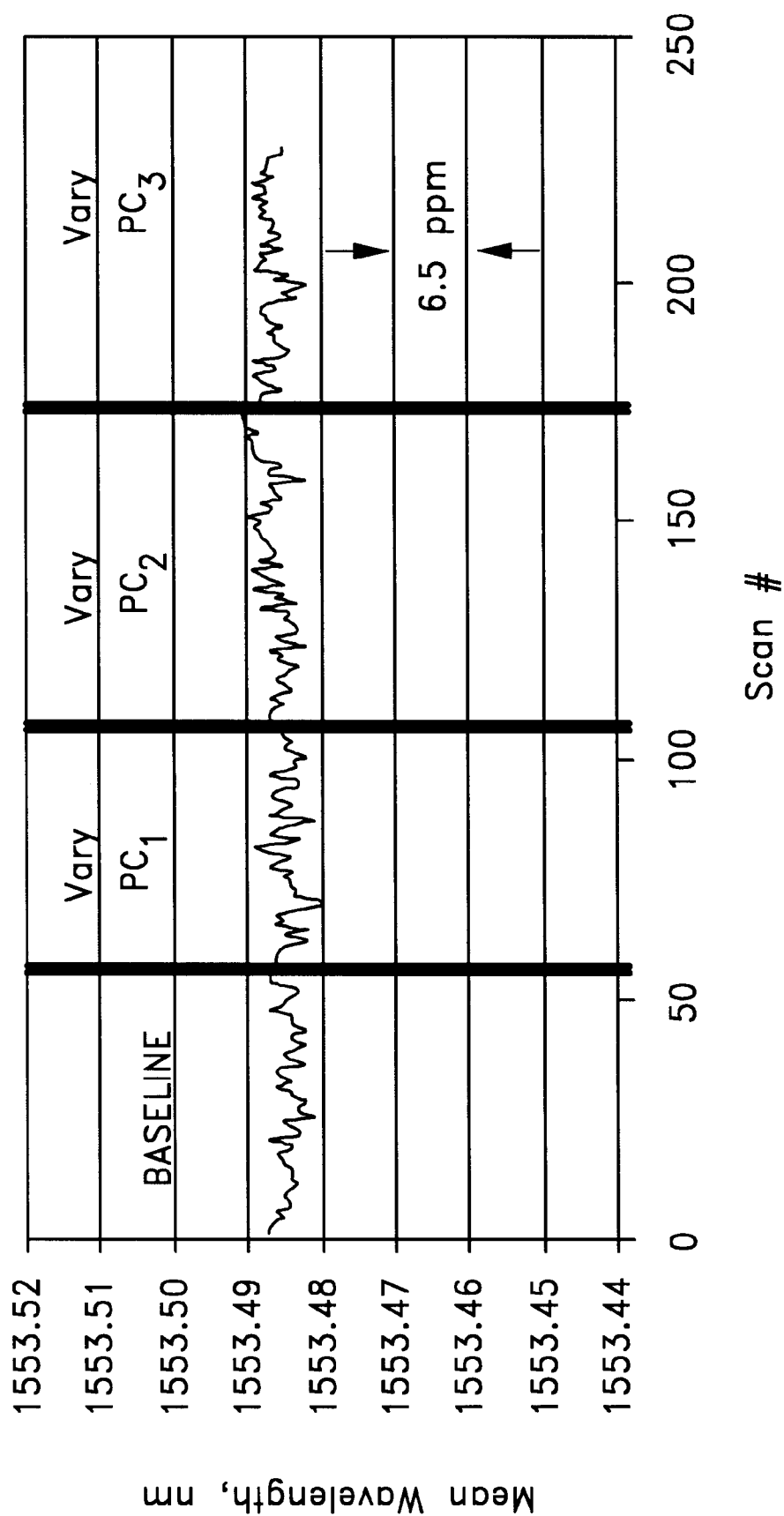
FIG. 4, comprising

A Lyot depolarizer was used for the depolarizer 300 of FIG. 3 to collect the experimental results presented below (FIG. 4). A Lyot fiber depolarizer generally comprises two lengths of highly birefringent fiber spliced together (for the experimental results reported herein, the Lyot depolarizer comprised 1 meter and 1.5 meter lengths), with their birefringence axes oriented 45° with respect to each other. (See, for example, K. Böhm, K. Petermann, and E. Weidel, "Performance of Lyot depolarizers with birefringent single-mode fibers," *J. Lightwave Technol.* Vol. 1, 71–74, March 1983.) A Lyot fiber depolarizer transforms polarized light into light with a state of polarization that depends strongly on wavelength. For example, a 30 nanometer (nm) broad spectrum characterized by a single polarization may be converted by a Lyot polarizer into, say, ten adjacent spectral intervals of 3 nm width each, with adjacent intervals having orthogonal polarizations.

Thus, if the spectrum of the light is broad enough, and if the lengths of the fibers in the Lyot depolarizer are long enough, the light output by the depolarizer will carry the same power in any two orthogonal linear polarizations, and the mean wavelength of these two polarizations will be identical.

For the results presented in FIG. 4 below, the pump source 100 was highly polarized, having an extinction ratio (the power of the more intense polarization divided by the power of the less intense polarization, in which the two polarizations are orthogonal) greater than 30 dB. After passing through the depolarizer 300, the pump light had an extinction ratio of around 3 dB or better, as described below. Experiments show that even a depolarizer that reduces the extinction ratio of the pump source to around 3 dB is sufficient to significantly improve the mean wavelength stability of the optical output of the fiber 118.

Figure 5:
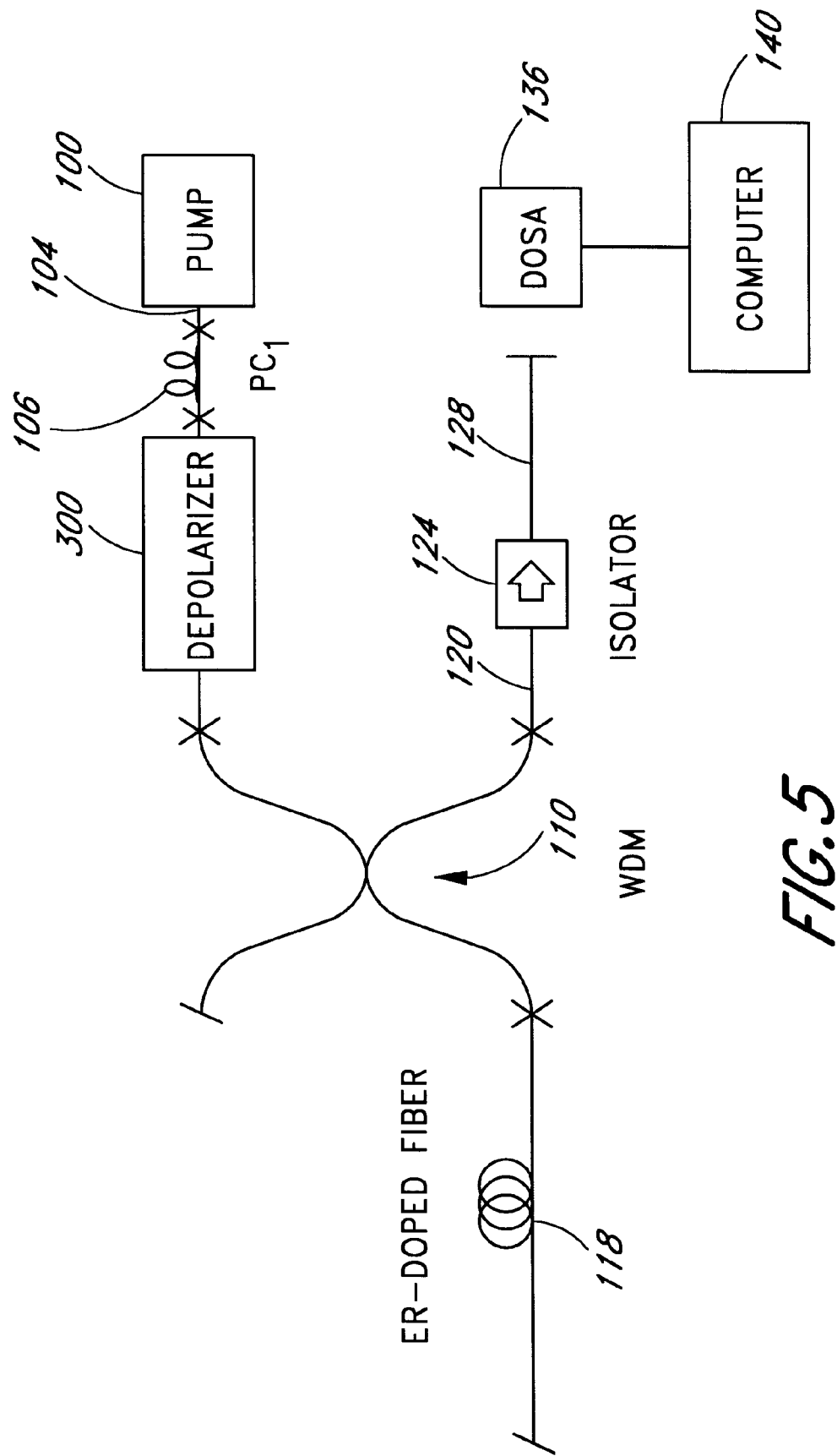
FIG. 5 shows an experimental setup for investigating the range of mean wavelengths from a superfluorescent fiber source as the polarization of the optical pump is varied, in which a polarization controller has been placed at the output end of the optical pump.

The foregoing is illustrated in FIGS. 4A and 4B. FIG. 4A, labeled "Baseline," represents a series of mean wavelength measurements using the embodiment of FIG. 5, which is similar to the embodiment of FIG. 3, except that a first polarization controller 106 (designated here as $PC_1$) has been added between the pump source 100 and the depolarizer 300. After passing through the depolarizer 300, the pump light had an extinction ratio that depends on the state of polarization of the light at the input of the depolarizer. For some input polarizations, i.e., for some orientations of the polarization controller $PC_1$, the light at the output of the depolarizer 300 is strongly depolarized. However, for other orientations of polarization controller $PC_1$, after passing through the depolarizer 300, the pump light had an extinction ratio of only about 3 dB. No parameters are varied during these tests, and the fluctuation in the measured mean wavelength represents the system noise. The data of FIG. 4B are also collected with the apparatus of FIG. 5, using the same methodology used to generate the results of FIG. 2. In particular, the orientation of the polarization controller is varied between scans to determine the extent of the variation of mean wavelength with changes in the pump polarization incident on the depolarizer 300. In FIG. 4B, the variation in the SFS mean wavelength is only about 3 ppm, which is a considerable improvement over the 110 ppm variations (see, for example, FIG. 2) observed using the same optical pump source 100 in the absence of a depolarizer 300. Further, this 3 ppm level appears to be no greater than the noise inherent in the experimental apparatus (see, for example, FIG. 4A), suggesting that the SFS stability could in fact be significantly better than 3 ppm. Thus, one conclusion to be drawn from FIGS. 4A and 4B is that the depolarizer 300 makes the optical output from the fiber 118 largely insensitive to perturbations in the pump polarization and to changes in the birefringence of the fiber pigtail 104. In preferred embodiments of the invention described herein, optical output is generated in which the mean wavelength is stable to within 100 ppm, and more preferably to within 50 ppm, and still more preferably to within 3 ppm.

Figures 6, 7:
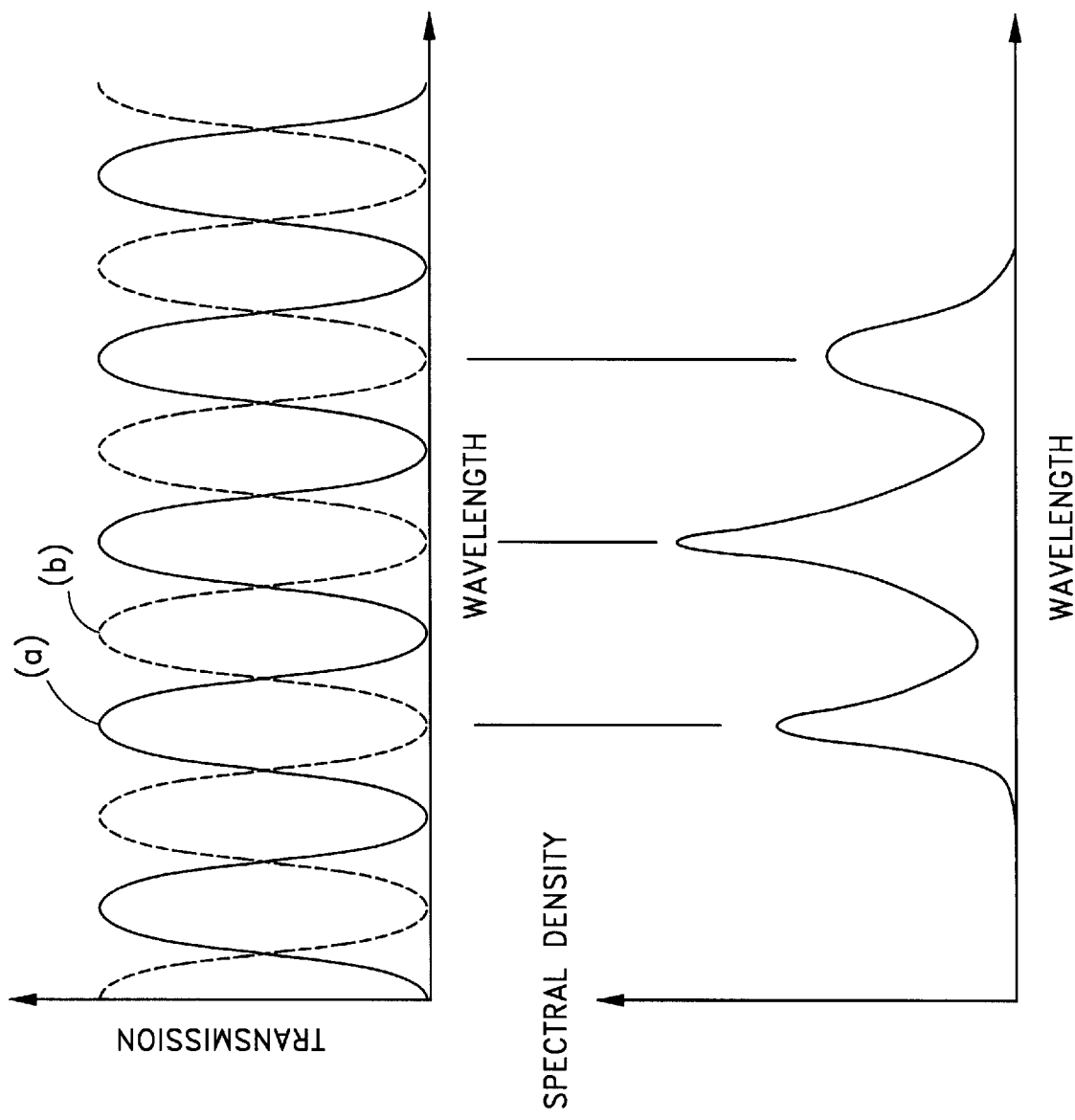
FIG. 6 shows typical transmission spectra from a Lyot depolarizer that comprise a nearly periodic series of maxima and minima.
FIG. 7 shows the spectral output from a hypothetical light source to illustrate the behavior of the Lyot depolarizer of FIG. 6.

The reason why the pump light is still about 3-dB polarized after passing through the Lyot depolarizer is now considered. For any given linear polarization input into a Lyot depolarizer, and for any given linear polarization at the output of the depolarizer, the transmission spectrum $f_1$ of the depolarizer comprises a nearly periodic series of maxima and minima, as illustrated by curve (a) in FIG. 6. As illustrated by curve (b) in FIG. 6, the transmission spectrum $f_2$ of the depolarizer for the orthogonal output polarization also comprises an approximately periodic series of maxima and minima, which are out of sequence with those of the transmission spectrum $f_1$. The spacing between maxima (or between minima) of both spectra decreases as the lengths of birefringent fiber used in the depolarizer are increased. If the (linear) polarization of the input light is rotated, the transmission spectra $f_1$ and $f_2$ will simply shift with wavelength, but their respective shapes will remain unchanged. As illustrated in FIG. 7, the broadband light emitted by a semiconductor source, such as those commonly used as pump sources for SFS sources, often exhibits a series of modes. If pump light having the spectrum of FIG. 7 is launched into a Lyot depolarizer and that light has a polarization that matches that of curve (a) of FIG. 6, then the light will not be well depolarized by the depolarizer, because most of the light's frequency components will be transmitted by the depolarizer without altering its polarization. This is why partially polarized light is observed for certain positions of the polarization controller $PC_1$ at the output of the depolarizer 300. For certain input polarizations the pump light accidentally matched the transmission spectrum of the depolarizer reasonably well, and light was poorly depolarized. For other positions of the polarization controller $PC_1$, however, the light output by the depblarizer 300 was much more strongly depolarized.

A possible remedy to this problem is to select an input polarization for the light that yields strongly depolarized output light. However, if the light is fed into the Lyot depolarizer through a standard, low-birefringence fiber, the state of polarization of the light entering the depolarizer will vary with environmentally induced changes in the birefringence of the low-birefringence fiber. A preferred solution is to select the lengths of the two fibers forming the depolarizer such that for the given spectrum of the pump source, and for all possible input polarizations, the transmission spectrum of the depolarizer is very different from the light spectrum.

Figure 8:
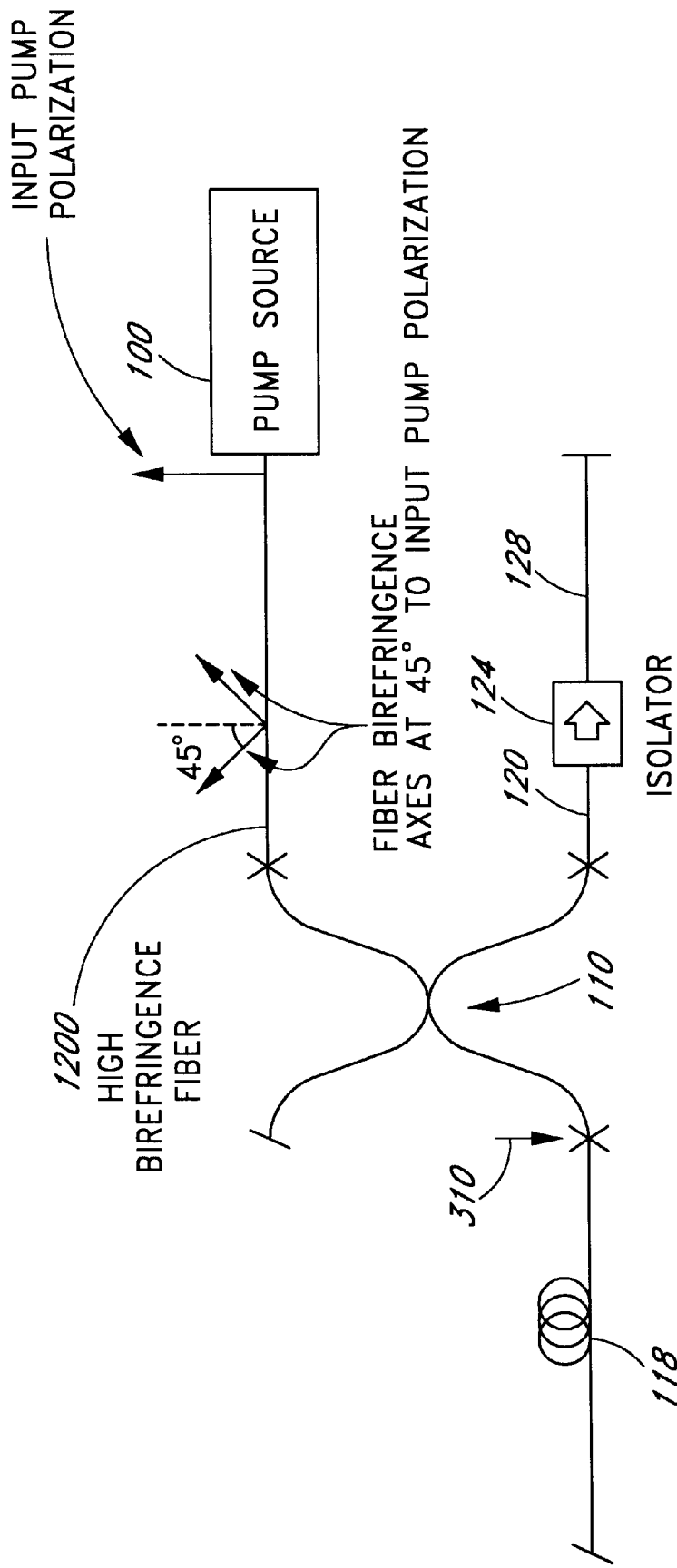
FIG. 8 shows an embodiment having an output whose mean wavelength is stable with respect to external perturbations, in which linearly polarized pump light is coupled directly into a depolarizer made from high birefringence fiber.

Another way of solving the aforementioned difficulty uses a depolarizer and couples linearly polarized pump light directly into the depolarizer, with the polarization of the light aligned at 45° to the axes of the depolarizer's high-birefringence fiber, as shown in FIG. 8. The first benefit of this configuration is that since the polarization of the light incident on the depolarizer is fixed, a second length of high-birefringence fiber at 45° to the first length is not needed. Such a depolarizer 1200 (FIG. 8) is advantageously made of a single length of high-birefringence fiber, which eliminates the need for a difficult and slightly lossy 45° splice between high-birefringence fiber, thereby reducing the cost of the depolarizer. The depolarizer 1200 may be advantageously butt-coupled to the pump 100. The second benefit is that the state of polarization of the light entering the depolarizer 1200 is stable against external perturbations. Consequently, the degree to which the pump light is depolarized is invariant in time, and the stability of the mean wavelength of the SFS pumped by this depolarized pump light is increased.

In general, the optical properties of the WDM coupler 110 and the optical isolator 124 exhibit some dependence on polarization, which will affect the spectrum, and possibly the mean wavelength, of the broadband light returning from the doped fiber 118. As a first case of interest, a "type I" polarization dependence is considered, namely a WDM coupler with a coupling ratio that has a wavelength-dependent polarization dependence. In this case, the coupling ratio is different for the two orthogonal states of polarization, and the ratio R of the coupling ratios at two orthogonal polarizations is not the same at all frequencies across the bandwidth of the ASE light. For example, at 1553 nm the coupler couples 98% for a given linear polarization and 100% for the orthogonal polarization (a ratio R=0.98), while at 1555 nm, the coupler couples 95% for the same first polarization and 99% for the same orthogonal polarization (a ratio R=0.95/0.99≈0.96). If fully unpolarized ASE light from the doped fiber 118 is launched into such a coupler, the light transmitted by the coupler (i.e., at a point between the coupler 110 and the isolator 124) will have a spectral shape that is different for the two polarizations, because the coupler has applied a differential filter function to the two polarizations. Therefore, the spectrum of the light transmitted by the coupler will have a different mean wavelength for the two polarizations. When such light is used as input into a gyroscope coil, for example, and if the birefringence of any portion of the fiber between the coupler and the gyroscope coil varies (e.g., due to external perturbations), the spectrum launched into the gyroscope coil, and thus the mean wavelength of this spectrum, will vary, which is undesirable.

Figure 9A:
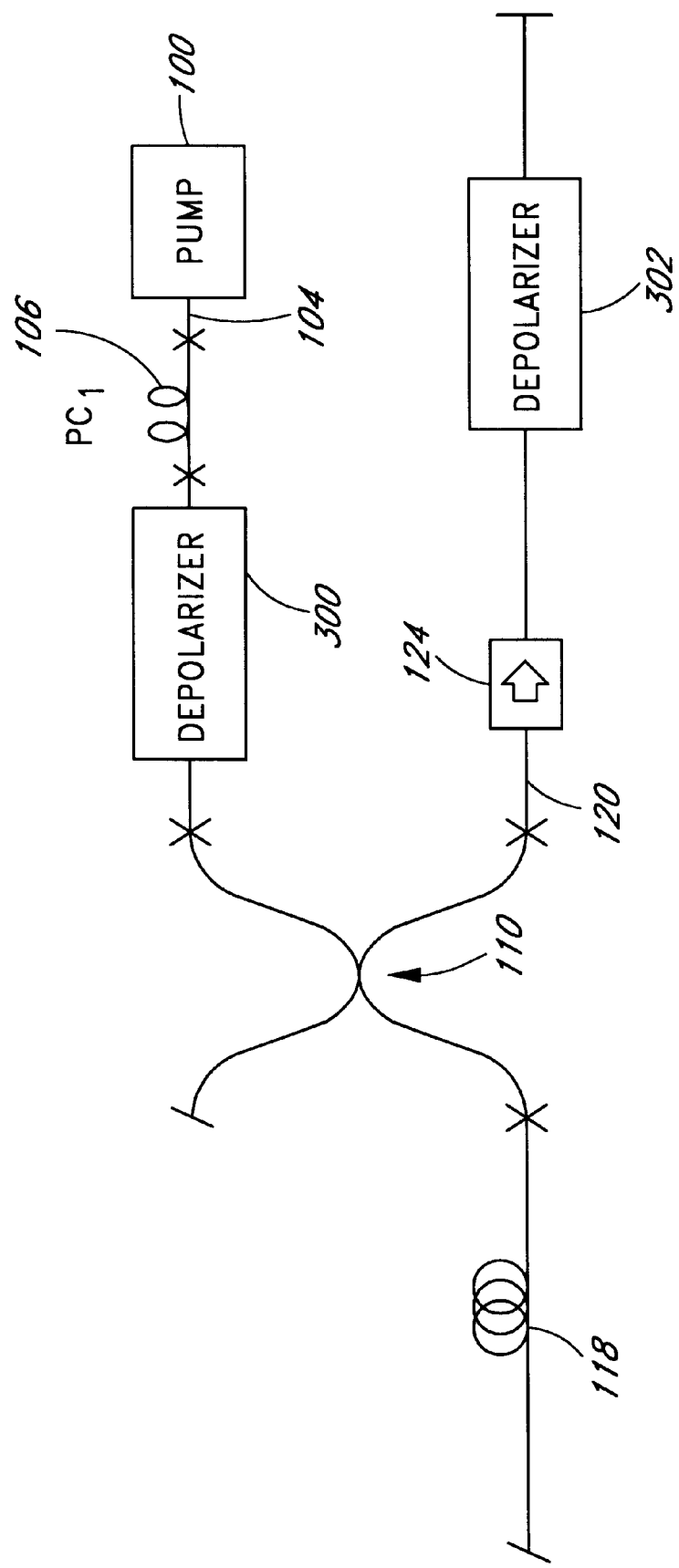
FIG. 9A shows an embodiment in which a second depolarizer, such as a Lyot depolarizer, is advantageously added downstream from a WDM coupler.

For example, the WDM coupler 110 used to generate the data presented here (manufactured by Gould Fiber Optics of Millersville, Md.) exhibits type I behavior. When substantially unpolarized broadband light in the 1.55 $\mu$m region is launched into it, the difference in the mean wavelength of orthogonal polarizations of the light transmitted by the coupler was measured to be 175 ppm. In order to reduce the effects of a coupler with a type I polarization dependence, a second depolarizer 302, such as a Lyot depolarizer, is advantageously added downstream from the WDM coupler, as illustrated in the embodiment of FIG. 9A.

The same general concern arises regarding the isolator 124. If the transmission of the isolator 124 depends on polarization, and this polarization dependence is a function of frequency, then the isolator 124 will modify the spectral content of two orthogonally polarized light signals differently, which is undesirable for the reasons mentioned above. Tests indicated that the polarization dependence of the transmission of the isolator 124 was less pronounced than the polarization dependence of the coupling ratio of the coupler. The polarization dependence of the isolator 124 is reduced by placing the second depolarizer 302 downstream from the isolator 124, as illustrated in FIG. 9A.

Next, a WDM coupler with a "type II" polarization dependence is considered, namely a WDM coupler having a coupling ratio whose wavelength-dependence is independent of polarization. In other words, the coupling ratio is different for the two orthogonal states of polarization, but the ratio R of the coupling ratios for orthogonal polarizations is the same at all frequencies across the bandwidth of the ASE light. If fully unpolarized ASE light from the doped fiber 118 is launched into such a coupler, the light transmitted by the coupler (i.e., at a point between the coupler 110 and the isolator 124) will have a spectrum that is identical for each of the two aforementioned orthogonal polarizations, except that one polarization will carry more power than the other. When such light is used as input into a gyroscope coil, and the birefringence of any portion of the fiber between the coupler 110 and the gyro coil varies, the power launched into the gyroscope coil will vary, though not by a large amount if R is not too far from unity, but the mean wavelength of the light launched into the gyro will be polarization independent. Consequently, a second depolarizer 302 is not required to correct this type of polarization dependence. Similarly, if the transmission of the isolator 124 also exhibits a type II polarization dependence, the isolator 124 will not affect the mean wavelength of the light passing through it, and a second depolarizer 302 in FIG. 9A is not required. In one preferred embodiment, the SFS uses a WDM and an isolator with type II polarization dependence.

In short, if both the isolator 124 and the coupler 110, as well as any other component added between the erbium-doped fiber 118 and the input polarizer to a gyroscope, exhibit a weak type II polarization dependence, a second depolarizer 302 is not required. However, if one or more of these components exhibits a strong type II polarization, i.e., if one polarization is much more strongly attenuated than its orthogonal polarization, a second depolarizer 302 is required. On the other hand, if either the isolator 124, the coupler 110, or any other component added between the erbium-doped fiber 118 and the gyro input polarizer exhibit a type I polarization dependence, a second depolarizer 302 is required.

Figure 9B:
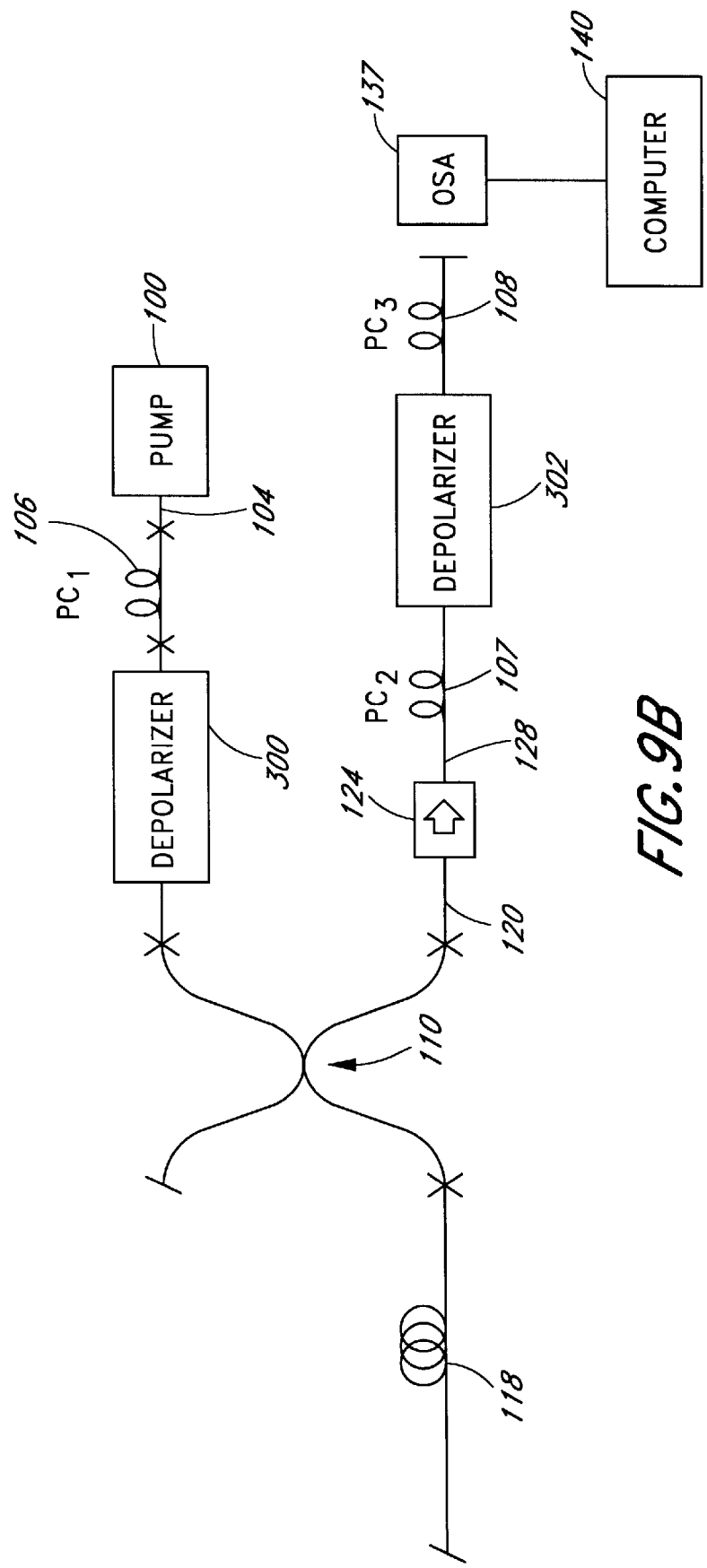
FIG. 9B shows an experimental setup for investigating the range of mean wavelengths from a superfluorescent fiber source as a function of polarization, and in particular, the effect that a wavelength division multiplexing (WDM) coupler may have on that range when the WDM has some polarization dependence.

To measure the effectiveness of the second depolarizer 302 in reducing the polarization dependence of the WDM coupler 110 and the isolator 124, a testbed of the superfluorescent source of FIG. 9A was constructed using a depolarizer 302 with two high birefringence fiber lengths of 1.5 meters and 3 meters, respectively. This testbed is shown in FIG. 9B. The optical output of the source was launched into an OSA 137, and the spectrum read by the OSA was captured and analyzed by a computer 140. The OSA 137 was a polarization-dependent optical spectrum analyzer, i.e., the optical spectrum that it produced depends on the polarization of the light launched into it. Two additional polarization controllers 107 and 108 (designated $PC_2$ and $PC_3$) are introduced, one on each side of the depolarizer 302 (see FIG. 9B). Because the OSA 137 produces a spectrum that depends on the polarization of the input light, if the depolarizer 302 were not effectively depolarizing the light from the SFS 118, the OSA would read a spectrum mean wavelength that depends on the orientation of either polarization controller 107 or 108. However, when the respective orientations of the polarization controller 107 and 108 are varied (see FIGS. 4C and 4D), the mean wavelength of the SFS spectrum measured by the OSA 137 is found to be within the system noise limit of 3 ppm. Consequently, the depolarizer 302 effectively reduces the polarization dependence of the SFS spectrum introduced by the WDM coupler 110 and the isolator 124.

Figure 10:
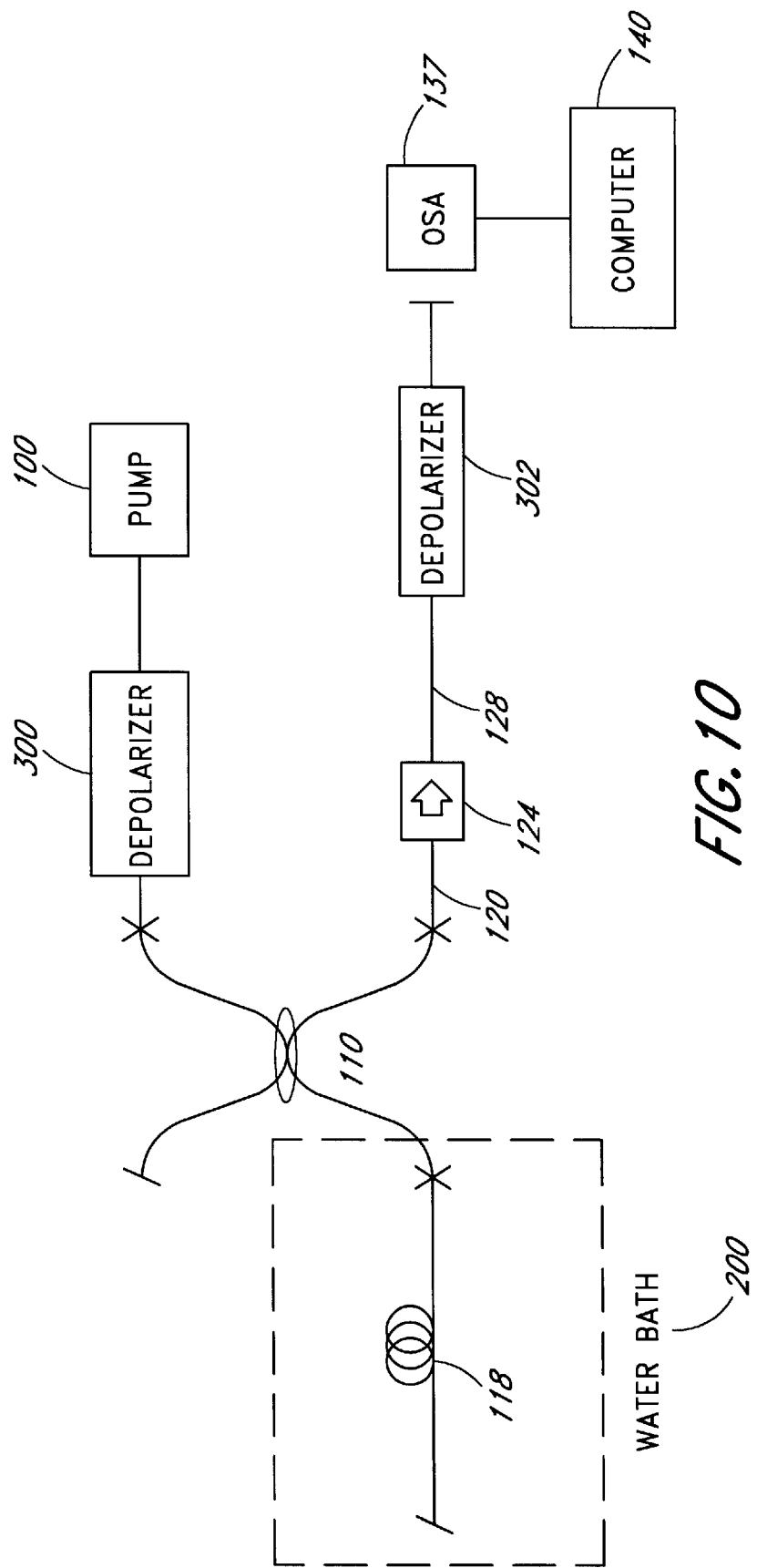
FIG. 10 shows an experimental setup for assessing the effectiveness of depolarizers in reducing variations in the mean wavelength of an SFS due to environmental perturbations, such as temperature variations, in which an erbium-doped fiber is placed in a water bath.
Figure 11:
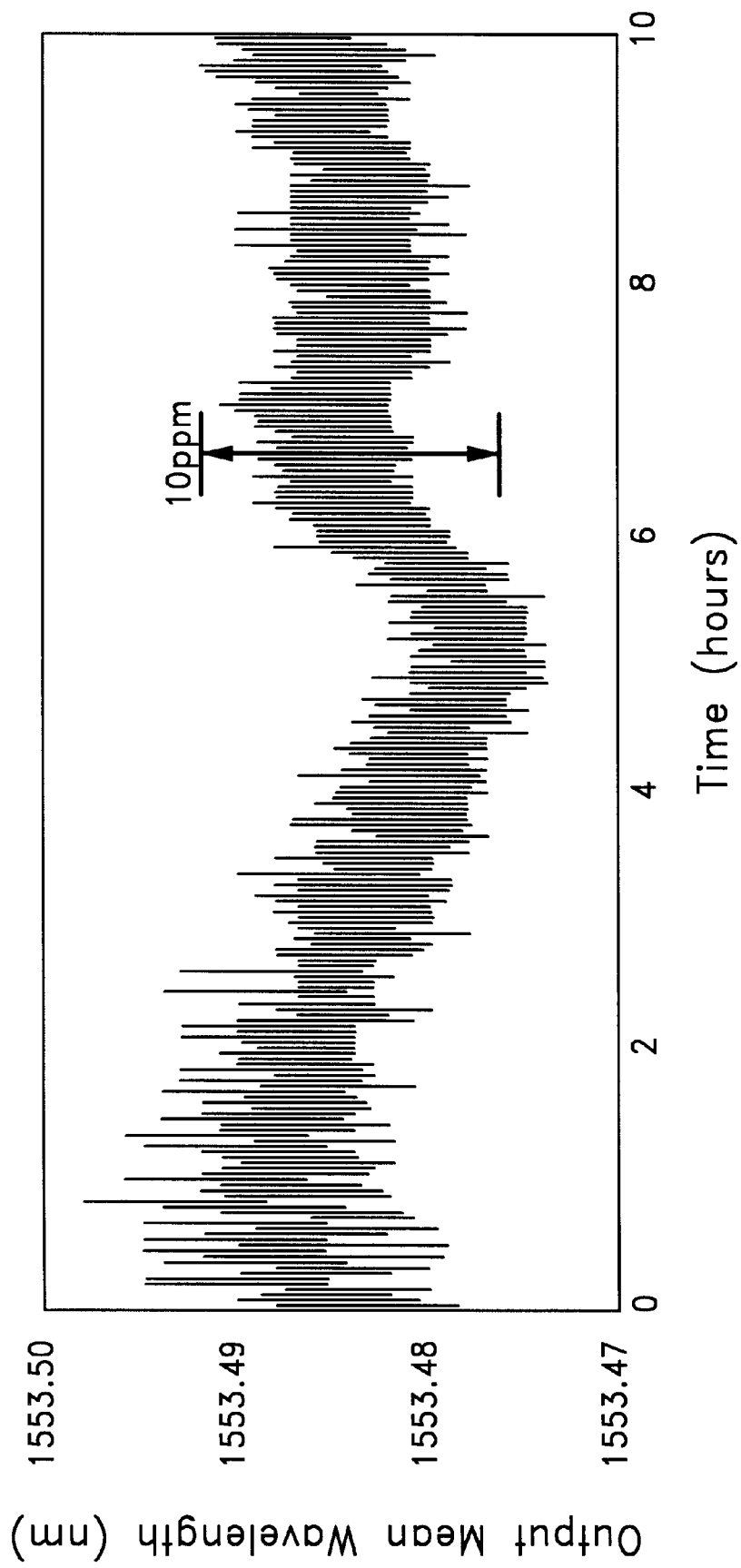
FIG. 11 shows experimental results obtained with experimental setup of FIG. 10, in which the mean wavelength of the source is plotted versus time.

To further assess the effectiveness of the two depolarizers 300 and 302 in reducing variations in the mean wavelength of an SFS due to environmental perturbations, the erbium-doped fiber 118 was placed in a water bath 200 at room temperature, as shown in FIG. 10, and recorded the mean wavelength of the source as a function of time for a period of 10 hours. During this period, none of the components in FIG. 10 was adjusted. The temperature of the bath 200 was unregulated, but it varied by at most ±1° C., and probably by only ±0.5° C., during the course of this test. The OSA 137 of FIG. 10 is the polarization-dependent instrument described earlier. The result of this test is shown in FIG. 11 in the form of the mean wavelength of the source plotted versus time. FIG. 11 shows that the mean wavelength of the source exhibits some short-term variations, of the order of 4 ppm peak to peak, as well as long-term variations, of the order of 6 ppm peak to peak. The same fiber source without the two depolarizers 300 and 302 exhibited considerably larger peak-to-peak variations in mean wavelength, measured to be 50 ppm in one 80 minute test. The conclusion is that the use of the two depolarizers 300 and 302 substantially improves the overall stability of the source mean wavelength.

Figure 9C:
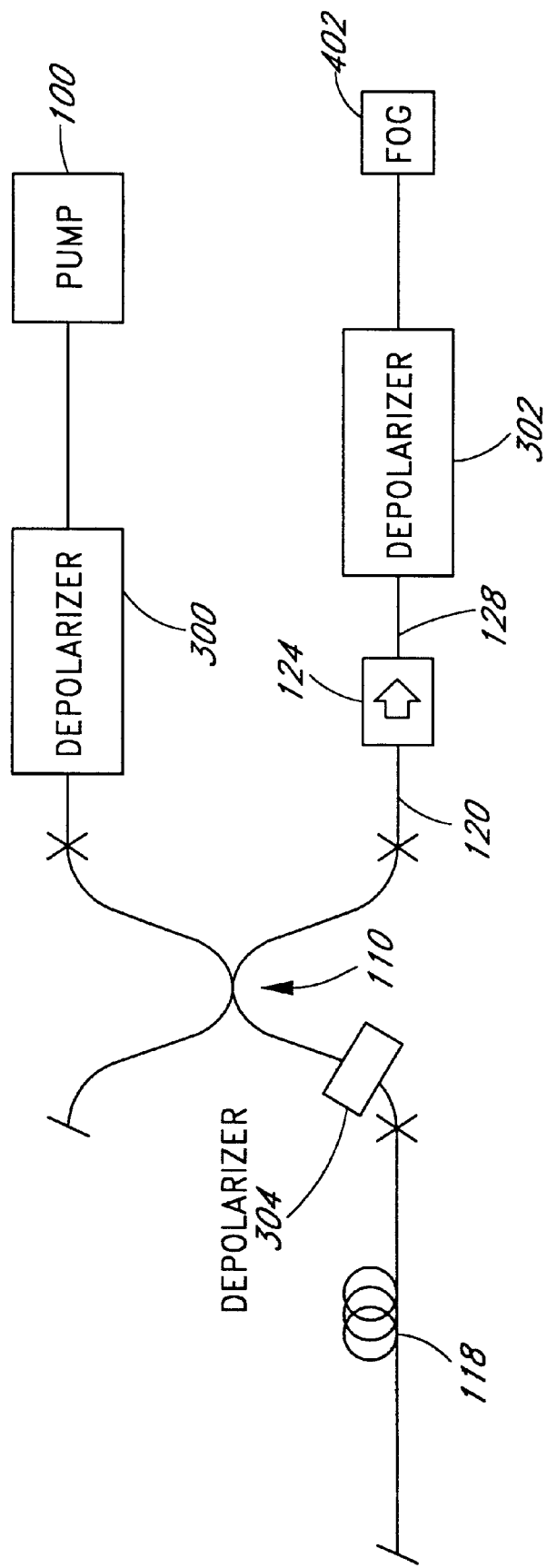
FIG. 9C shows an embodiment that comprises a fiber optic gyroscope and up to three depolarizers located at various points in the device.

In the embodiment of FIG. 9C, optical output is directed into an internal polarizing element (i.e., a polarizer, not shown) of a fiber optic gyroscope 402, in which the optical output passes through the polarizer before entering the rotation sensing coil (not shown) of the gyroscope. (All of the superfluorescent sources disclosed herein may advantageously be used as optical input to a fiber optic gyroscope.) Three depolarizers 300, 302, 304 are shown, and one, two, or all three of these depolarizers may be used. The depolarizer 300 alone may be sufficient if the coupling ratio of the WDM coupler 110, the transmission of the WDM coupler 110, and the transmission of the isolator 124 are polarization independent. The depolarizer 304 depolarizes the pump light in one direction and ASE traveling in the other direction. The depolarizer 302 depolarizes the output signal to remove polarization effects introduced by the WDM coupler 110 and the isolator 124. However, the depolarizer 302 does not correct for polarization-dependent gain, so that if there is polarization-dependent gain in fiber 118, either the depolarizer 300, the depolarizer 304, or both depolarizers, must be used in addition to depolarizer 302 to correct for this problem. All depolarizers introduce a small but finite loss. In the limit that the depolarizers 300, 302, and 304 become lossless and inexpensive, it becomes advantageous to use all three of them.

Figure 12A:
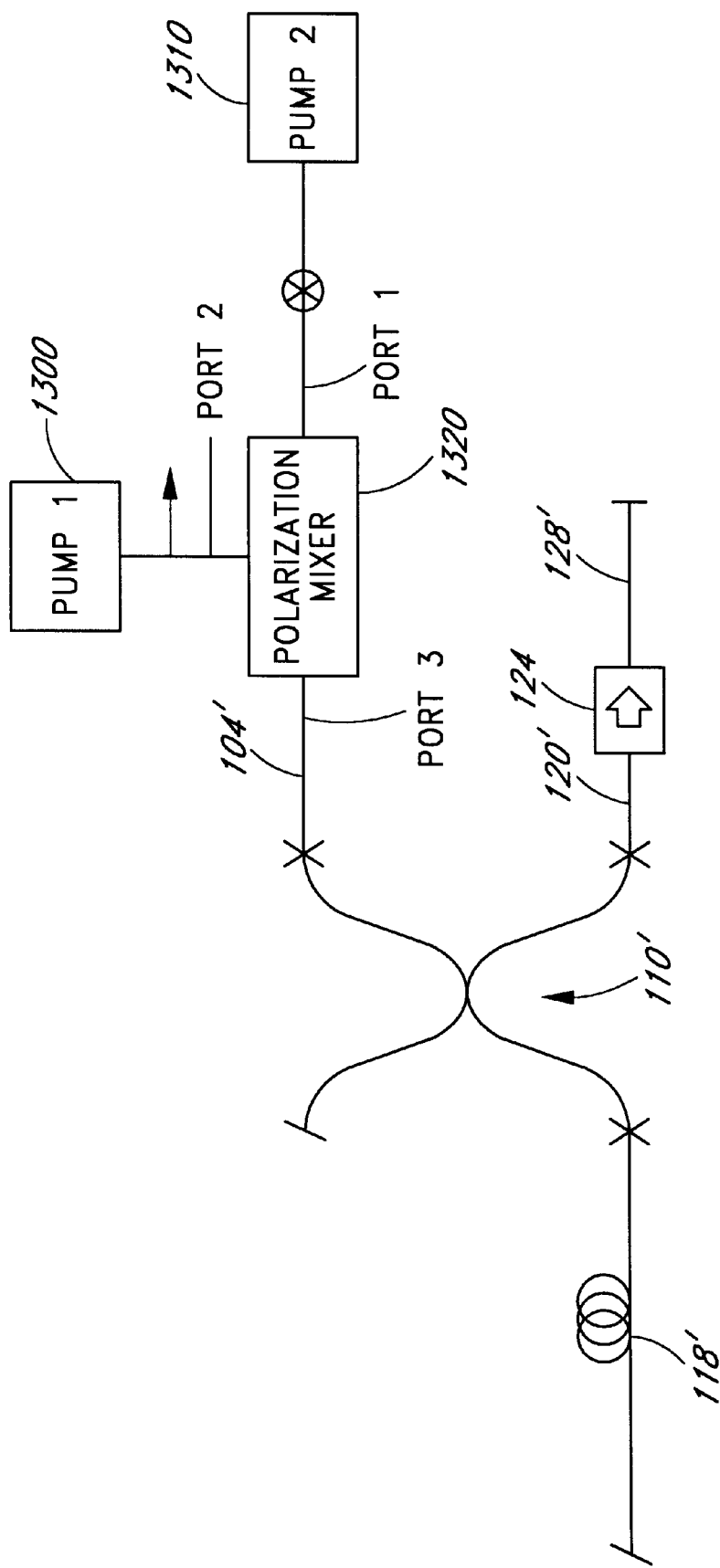
FIG. 12A shows an embodiment for reducing the pump polarization dependence of the source mean wavelength, in which the superfluorescent source is pumped with two linearly polarized pump sources with substantially the same spectrum and polarization, in a backward configuration.

Another method of reducing the pump polarization dependence of the source mean wavelength is to pump the superfluorescent source with two (or more) linearly polarized pump sources with substantially the same spectrum. As illustrated in FIG. 12A, a first pump source 1300 and a second pump source 1310 can be multiplexed through a polarization mixer 1320, a device that couples a first pump having a first polarization from port 1 to port 3, and a second pump having a second polarization from port 2 to the same port 3, with the two pump polarizations being perpendicular in port 3. The polarization mixers herein can be, for example, either a polarizing cube or a polarization-dependent coupler, such as an all fiber polarization dependent coupler or a fiber pigtailed bulk optic polarization coupler. In FIG. 12A, the primed components function like their analogous components of FIG. 3, except that the primed components (the output pigtail 104', the optical coupler 110', the doped fiber 118', and the isolator pigtails 120' and 128') are all polarization maintaining. (Alternatively, the output pigtail 104', the optical coupler 110', the doped fiber 118', and the isolator pigtails 120' and 128' of FIG. 12A may be non-PM components.)

Embodiments in addition to the embodiment shown in FIG. 12A are now described which likewise rely on pumping an erbium-doped fiber (EDF) with two orthogonally polarized pump sources. These embodiments are illustrated in FIGS. 12B, 12C, and 12D, corresponding respectively to a forward-pumped configuration, a double-pass configuration, and a double-pass configuration with an additional Lyot depolarizer.

Figure 12B:
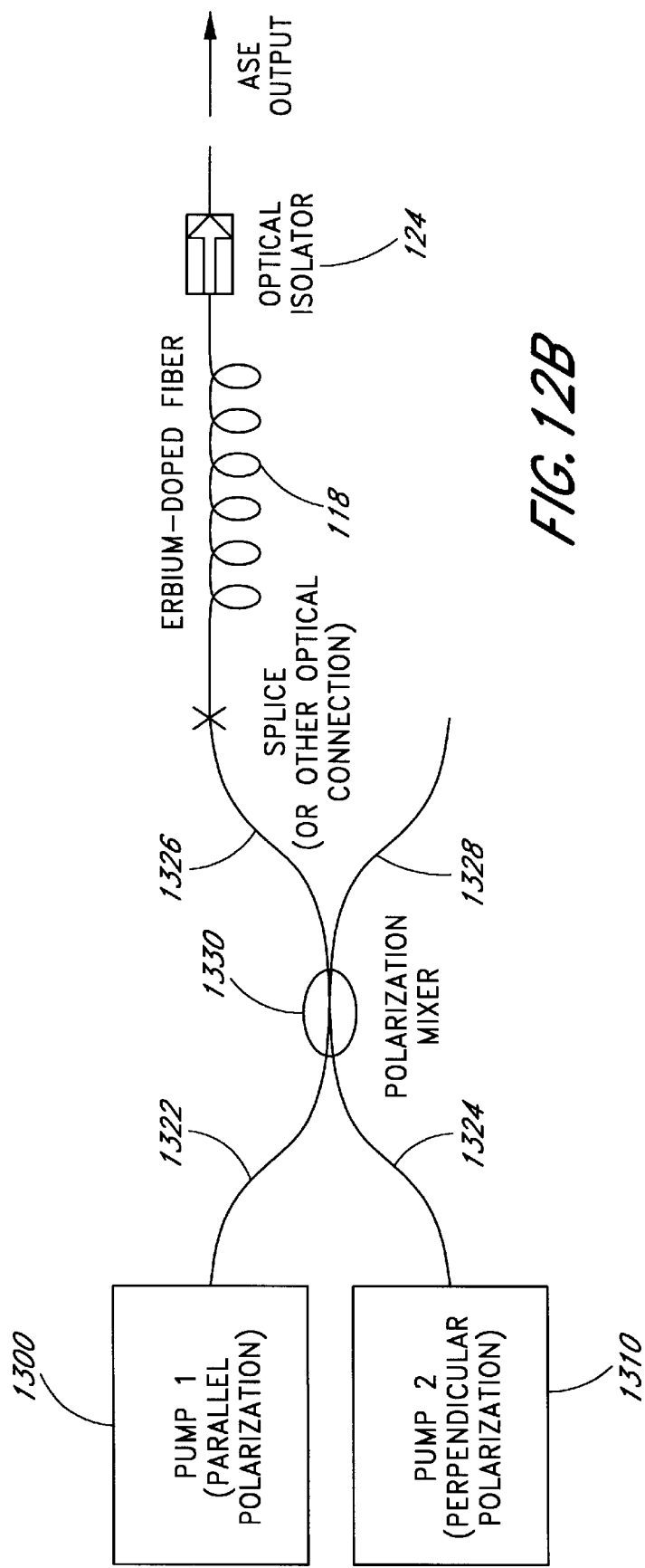
FIG. 12B shows an embodiment for reducing the pump polarization dependence of the source mean wavelength which employs two linearly polarized pump sources in a forward configuration.

A forward superfluorescent source is illustrated in FIG. 12B, in which two linearly polarized pump sources 1300, 1310 are optically combined with a polarization mixer 1330. The polarization mixer 1330 in FIG. 12B is shown as a polarization fiber coupler having input fibers 1322, 1324 and output fibers 1326, 1328, although a cube beam splitter may be used as the polarization mixer, for example. The two pump sources 1300, 1310 are coupled to the input fibers 1322, 1324, respectively, and deliver the same power. The input fibers 1322, 1324 are advantageously PM fiber. The two pump sources 1300, 1310 are launched along a different birefringence axis of the PM fibers 1322, 1324. The polarization fiber coupler 1330 transmits one polarization (for example, the polarization in the plane of FIG. 12B), but essentially fully couples the orthogonal polarization (e.g., the polarization perpendicular to the plane of FIG. 12B). Consequently, the output fiber 1326, which is coupled to an erbium doped fiber 118, carries pump light having two orthogonal polarization components of equal power. The output fiber 1326 and the erbium-doped fiber 118 to which it is optically connected are not necessarily PM fiber. (The output port corresponding to fiber 1328 may or may not be used.) An optical isolator 124 reduces unwanted optical feedback. As the two pump signals from pump sources 1300, 1310 travel through the input fibers 1322, 1324, the states of polarization of the signals remain orthogonal to each other at all points along the input fibers. Thus, the erbium-doped fiber 118 is pumped with two orthogonal pump signals, and the gain of the erbium-doped fiber 118 is free of polarization dependence.

For the gain of the erbium-doped fiber 118 to be completely free of polarization dependence, the two pump polarizations in the output fiber 1326 should carry identical power. Ideally, the polarization mixer 1330 completely transmits the pump signal of the pump source 1300 into the fiber 1326 (i.e., this transmission $T_1$ is unity), and the polarization mixer 1330 completely couples the pump signal of the pump source 1310 into the fiber 1326 (i.e., this transmission $T_2$ is unity). However, some polarization mixers exhibit a $T_1$ that differs (sometimes only slightly) from $T_2$, for example, due to polarization-dependent loss or a design that is less than optimum. In this case, if the pump powers launched into the fibers 1322 and 1324 are equal, the two pump powers in the output fiber 1326 will be slightly different. To correct for this imbalance, one or both of the pump powers launched into fibers 1322 and 1324 must be adjusted accordingly.

Figure 12C:
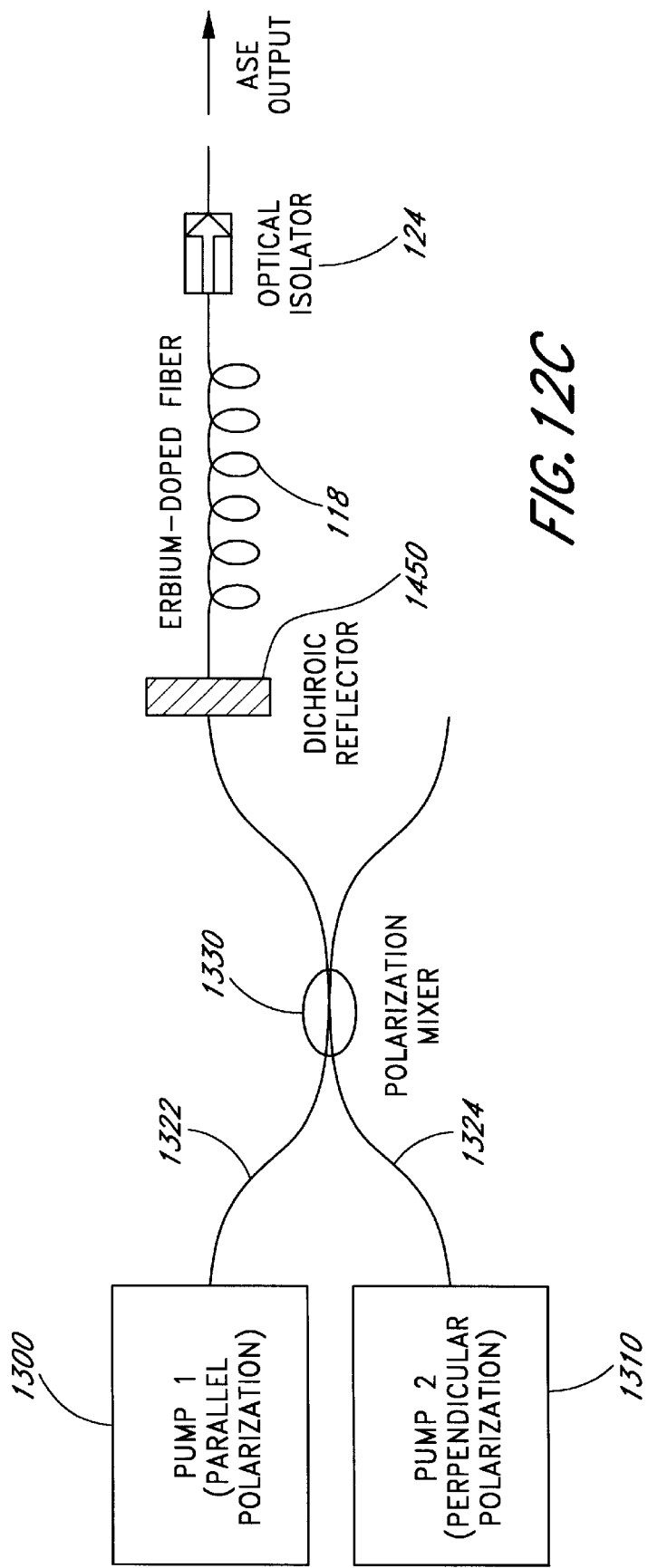
FIG. 12C shows an embodiment for reducing the pump polarization dependence of the source mean wavelength which employs two linearly polarized pump sources in a double-pass configuration.
Figure 12D:
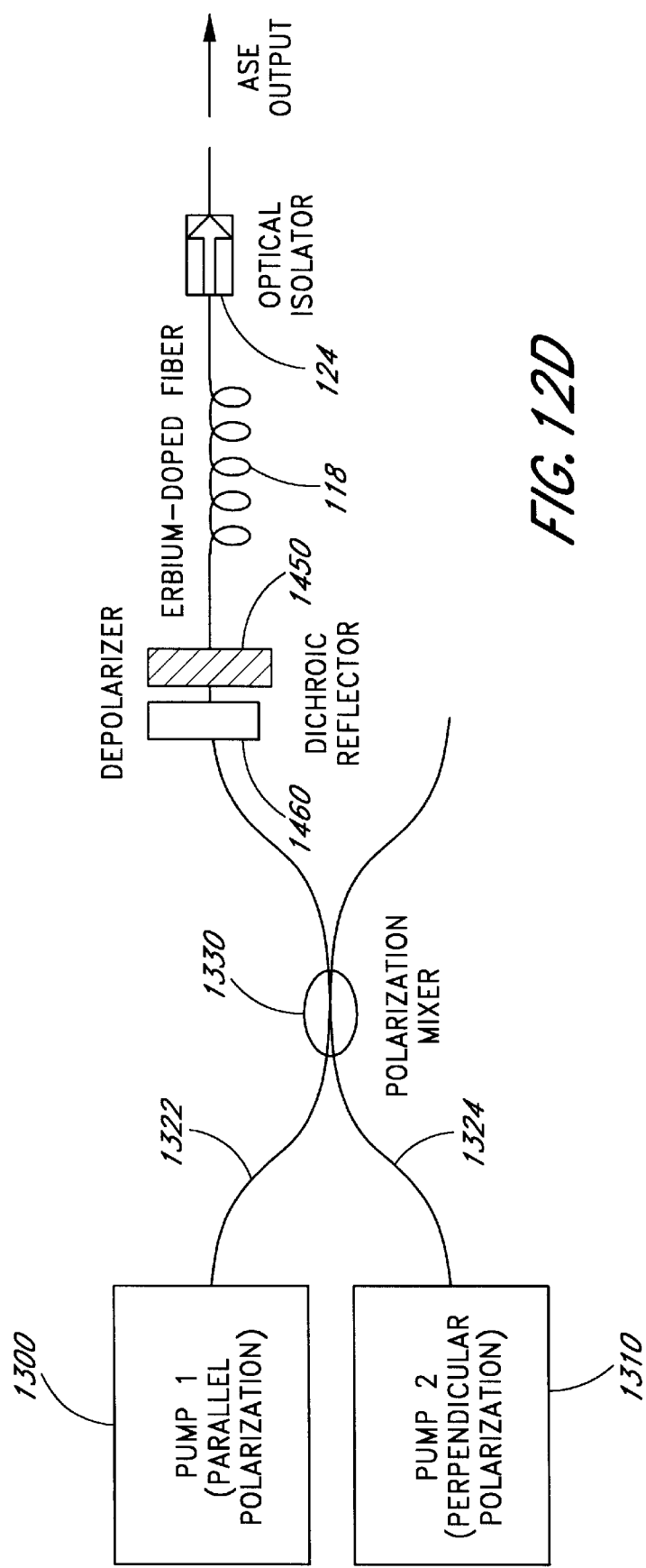
FIG. 12D shows an embodiment that is similar to the embodiment of FIG. 12C except that a depolarizer has been added.

Two orthogonally oriented pump sources 1300, 1310 are used in the double pass SFS configuration illustrated in FIG. 12C. A dichroic reflector 1450 is placed at the pump input end of the EDF 118 so that this SFS operates in a double-pass configuration. The dichroic reflector 1450 is designed to have (1) a high reflection coefficient (ideally 100%) over a good fraction (ideally all) of the source's ASE spectral range, and (2) a high transmission coefficient (ideally 100%) at the pump wavelength. Once again, the polarization mixer 1330 is illustrated as being a polarization fiber coupler, although a cube beam splitter can be used. The embodiment of FIG. 12C offers the advantages of a lower threshold, a lower pump power requirement, and a shorter required length of the erbium-doped fiber. The dichroic reflector 1450 may be a bulk-optic device, a fiber Bragg grating reflector, or it may comprise multiple dielectric layers deposited directly onto the pump input end of the EDF 118. The pump output end of the EDF 118 in FIGS. 12A, 12B, 12C, and 12D (discussed below) is optically terminated, for example, by polishing or cleaving the end of the fiber 118 at an angle, or splicing it to a coreless fiber. The fiber end may be followed (in the optical path sense) by an optical isolator 124. As an alternative to the double-pass superfluorescent source illustrated in FIG. 12C, a dichroic reflector 1450 may be placed in the embodiment of FIG. 12A between the WDM coupler 110' and the input pigtail 120' of the isolator 124, but this would necessitate making the left end of the EDF 118' the output port and placing an optical isolator at that end.

The effectiveness of the embodiments shown in FIGS. 12A, 12B, and 12C may be improved by placing a depolarizer in the path of the multiplexed pump signals. For example, in the case of FIG. 12A, a depolarizer 1460 may be placed between the output pigtail 104' of the polarization mixer 1320 and the WDM coupler 110'. In FIG. 12B, a depolarizer 1460 may be placed between the polarization mixer 1330 and the EDF 118. In the embodiment of FIG. 12C, a depolarizer 1460 may be placed between the polarization mixer 1330 and the dichroic reflector 1450, as illustrated in FIG. 12D. The depolarizer 1460 in FIG. 12D (which can, for example, be a Lyot depolarizer either in a bulk-optic form or a fiber form) depolarizes each of the two orthogonal pump signals traveling through it. The role of the depolarizer 1460 is to distribute the power in each pump signal evenly onto two orthogonal polarization axes, which may be important if the two pump sources 1300, 1310 do not generate the same pump power. If a depolarizer is not used (e.g., FIGS. 12A, 12B, and 12C) and the pump sources 1300 and 1310 generate different power levels, there will be some polarization-dependent gain. In the embodiment shown in FIG. 12D, however, the depolarizer 1460 acts to reduce this residual polarization dependent gain, and thus to reduce the dependence of the mean wavelength of the SFS on the input polarization of the pump sources and any difference in power between the two pump sources.

Figure 13A:
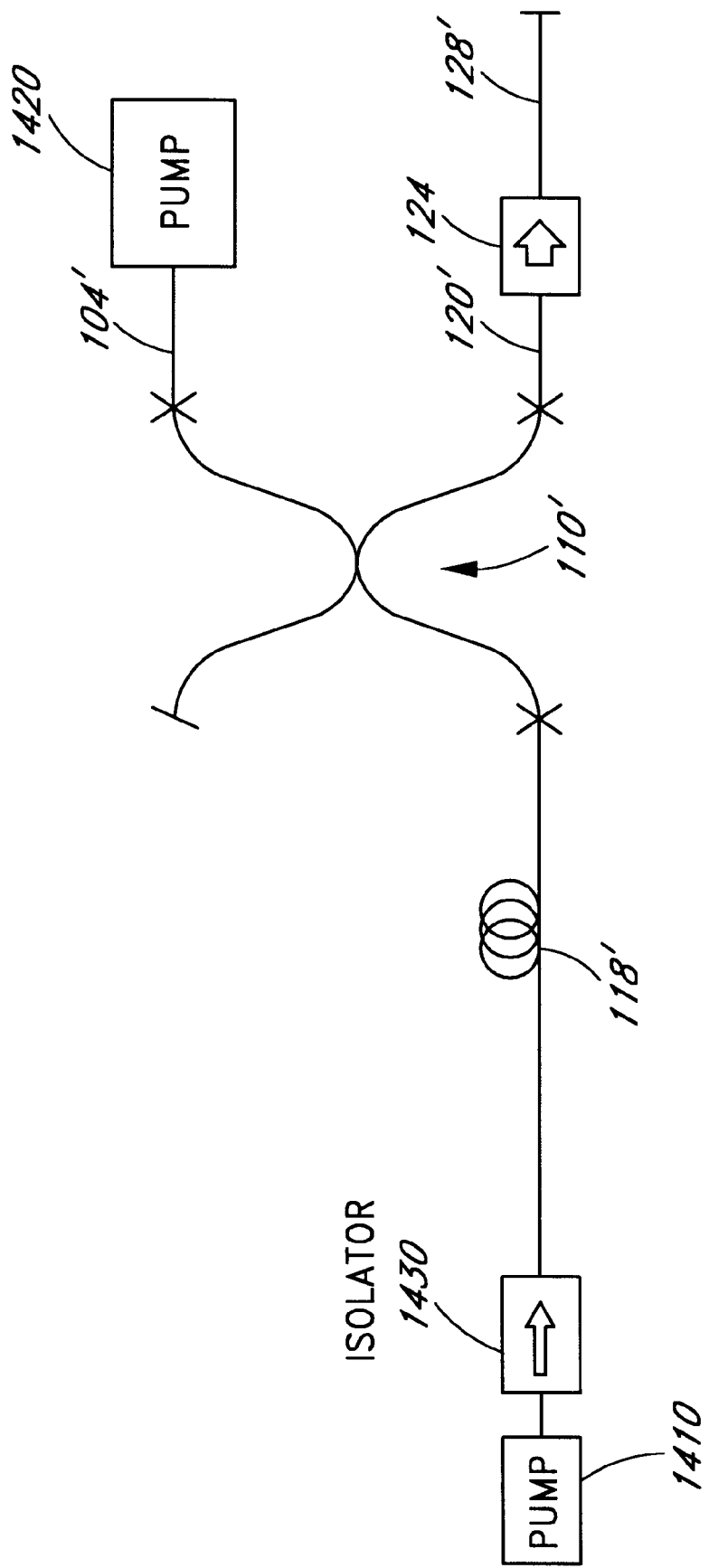
FIG. 13A shows an embodiment for reducing the pump polarization dependence of the source mean wavelength, in which the superfluorescent fiber source is bidirectionally pumped.

Alternatively, as illustrated in FIG. 13A, the superfluorescent source can be bidirectionally pumped, i.e., pumped from one end with a pump source 1410 having a first polarization, and pumped from the other end with a pump source 1420 having a second polarization orthogonal to the first. Output from the pump source 1410 may be advantageously passed through an isolator 1430. Likewise, output from the pump source 1420 may be passed through an isolator (not shown) positioned between the pump source 1420 and the WDM coupler 110'. With both pump sources 1410 and 1420, care must be taken to use free space or high-birefringent waveguides to bring the pump light from the pump source to the superfluorescent fiber 118', so that the pump light enters the superfluorescent source with the proper polarization. In this method, it is important that for every frequency component, the polarizations of the two pump signals remain essentially orthogonal along the length of the superfluorescent source. One solution for satisfying this requirement is to make the superfluorescent source from a short optical waveguide, such as a standard single-mode fiber, a planar-geometry or integrated optic waveguide, with a high dopant concentration. A second solution for satisfying the orthogonality requirement discussed above is to make the EDF from a high-birefringence single-mode fiber, or to use a high-birefringence planar-geometry or a high-birefringence integrated optic waveguide. In this case, one of the pumps is launched along the slow axis of the guide, and the other pump along the fast axis of the guide, either in the same or opposite directions. The high birefringence guarantees that the two pumps remain orthogonal along the entire length of the waveguide. In both cases, the spectra of the two pump sources do not need to be identical. The spectra can in fact be different, provided that they are such that substantially the same optical gain spectrum is created for light propagating along either one or the other of the birefringence axes of the waveguide.

Even when the fiber 118' of FIG. 13A is pumped simultaneously in opposite directions with the same power, simulations show that the forward and backward ASE outputs from the fiber 118' are still slightly polarized, such that their mean wavelength difference $\Delta$ is not zero. If, for example, pump light from the first pump 1410 (which is linearly polarized) is launched along the x axis of fiber 118', and pump light of equal power from the second pump 1420 (which is also linearly polarized) is launched along the y axis, the ASE exiting to the left in FIG. 13A ($ASE_1$) is slightly polarized along the x axis, while the ASE exiting to the right in FIG. 13A ($ASE_2$) is slightly polarized along the y axis. The physical explanation for this phenomenon is that $ASE_1$ is the sum of backward ASE generated by the first pump source 1410 and forward ASE generated by the second pump source 1420. Since backward ASE is always more intense than forward ASE (unless the fiber is very short, in which case they are identical), the largest contribution to $ASE_1$ is backward ASE generated by the first pump source 1410, with $ASE_1$ being slightly polarized along x. Conversely, $ASE_2$ is mostly generated by the y-polarized second pump source 1420, with the result that $ASE_2$ is slightly polarized along the y-axis. Consequently, both $ASE_1$ and $ASE_2$ have non-zero $\Delta$. As these arguments demonstrate, in order to generate an ASE emission with $\Delta=0$, it is not in general sufficient to pump bidirectionally, and it is advantageous to eliminate the residual asymmetry inherent in the embodiment of FIG. 13A.

One way to eliminate this residual asymmetry is to introduce a small difference in the powers of the two pump sources 1410, 1420. That such a difference in the powers of the pump sources 1410, 1420 can eliminate this asymmetry can be understood from physical considerations as follows. In the event that one of the pump sources is turned off completely, e.g., the second pump source 1420, then $ASE_1$ is still slightly polarized along the x-axis, i.e., its mean wavelength along the x-axis, $<\lambda_x>$, differs from its mean wavelength along the y-axis, $<\lambda_y>$. Specifically, $<\lambda_x>$ is slightly shorter than $<\lambda_y>$, and the mean wavelength difference $\Delta=<\lambda_x>-<\lambda_y>$ is negative. If, on the other hand, the second pump source 1420 is on while the first pump source 1410 is off, then $ASE_1$ is entirely generated by the second pump source, which is polarized along the y-axis, such that $ASE_1$ is slightly polarized along the y-axis. In this case, the mean wavelength of $ASE_1$ along the y-axis, $<\lambda_y>$, is slightly shorter than that along the x-axis $<\lambda_x>$, and the difference $\Delta=<\lambda_x>-<\lambda_y>$ is positive. In short, when the power $P_1$ of the first pump source 1410 is finite and the power $P_2$ of the second pump source 1420 is zero, $\Delta$ is negative, whereas when $P_1$ is zero and $P_2$ is finite, $\Delta$ is positive. It follows that there must be a specific combination of powers $P_1$ and $P_2$ for which $\Delta=0$.

Figure 13B:
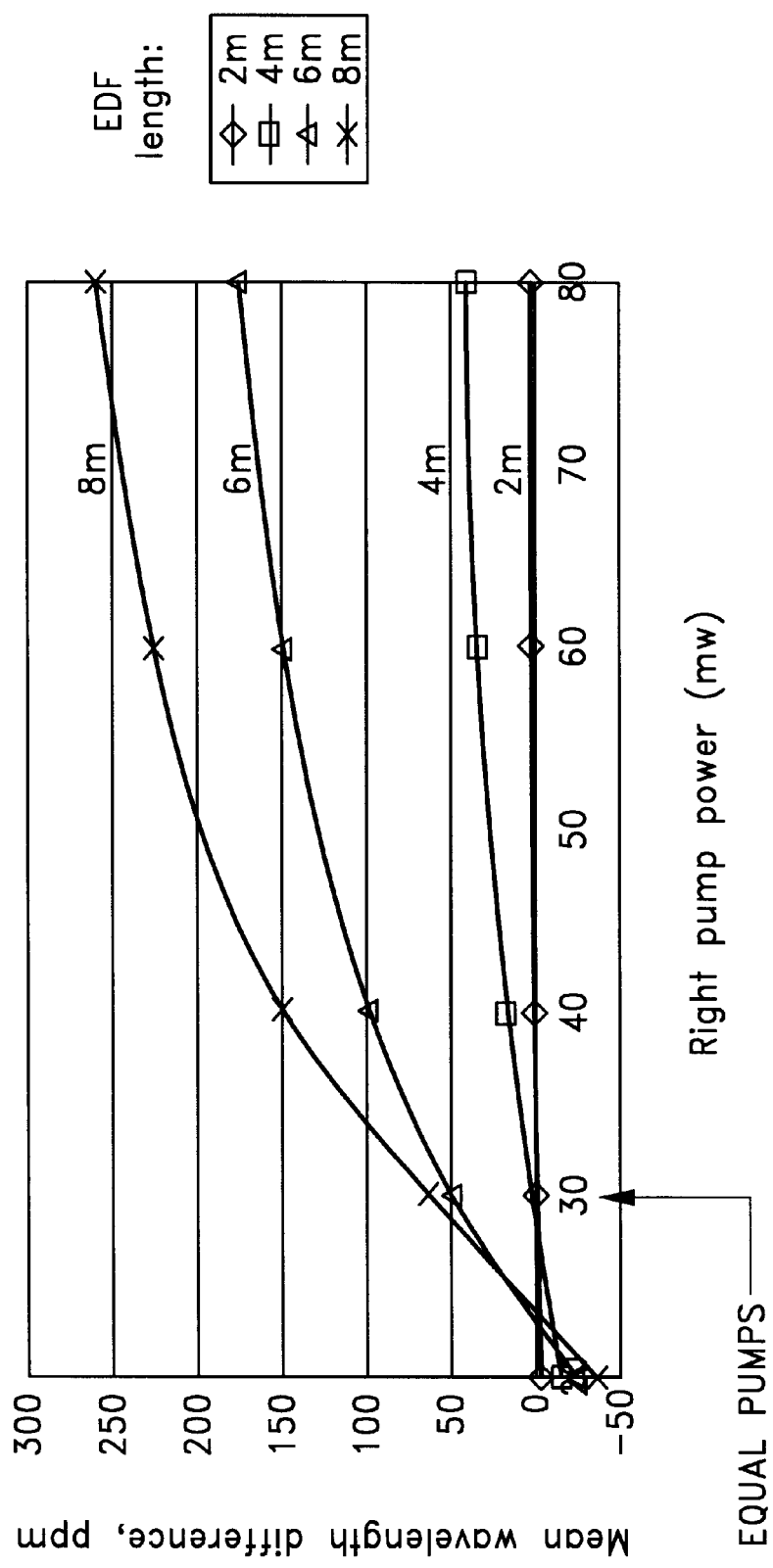
FIG. 13B presents the results of a simulation corresponding to the embodiment of FIG. 13A, in which the power of the left pump is fixed at 30 mW, and the mean wavelength difference between polarizations of the amplified spontaneous emission (ASE) traveling from left to right is plotted as a function of the power of the right pump.
Figure 13C:
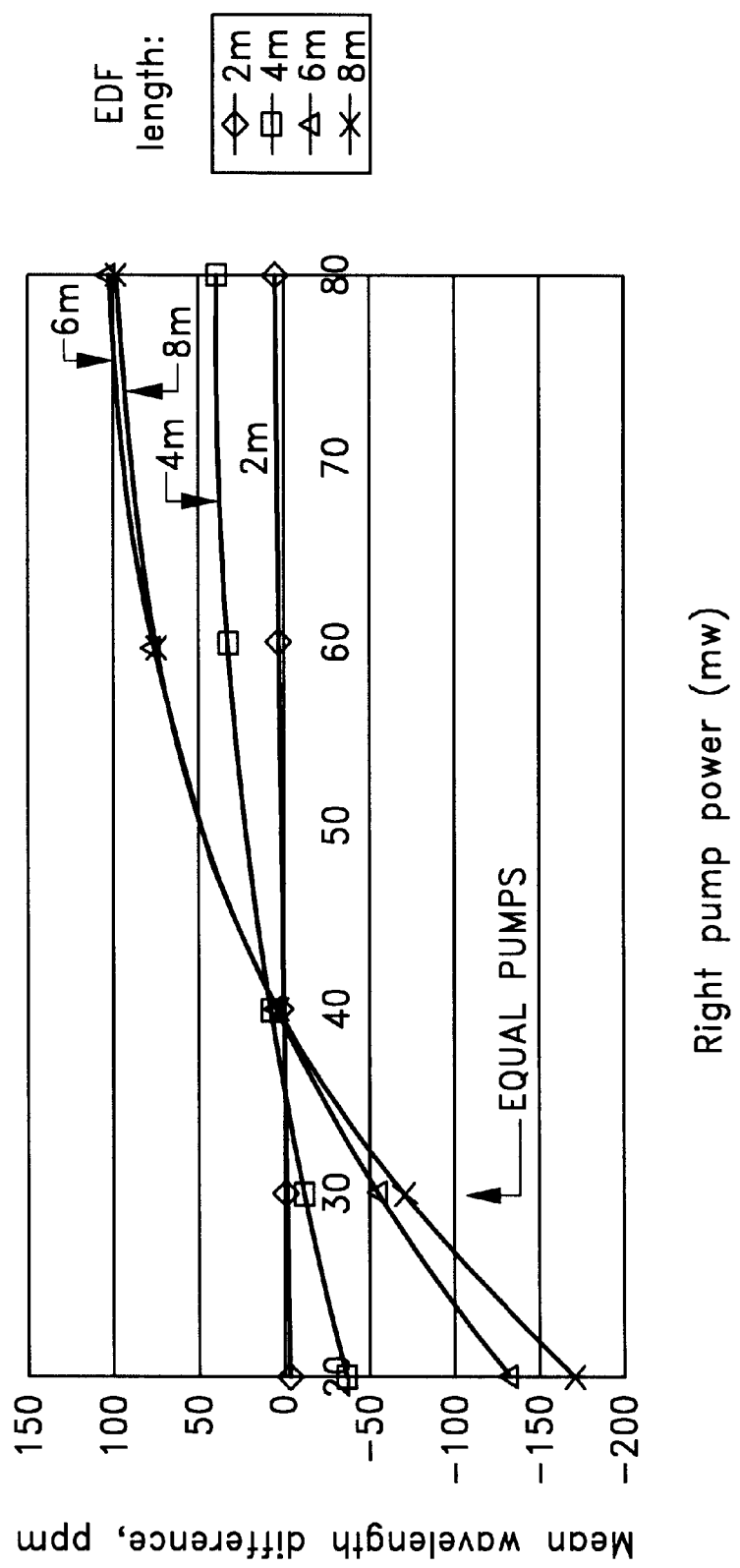
FIG. 13C presents the results of a simulation corresponding to the embodiment of FIG. 13A, in which the power of the left pump is fixed at 30 mW, and the mean wavelength difference between polarizations of the amplified spontaneous emission (ASE) traveling from right to left is plotted as a function of the power of the right pump.

A method of selecting the appropriate power $P_2$ (for a given power $P_1$) that produces $\Delta=0$ is illustrated in FIG. 13B. FIGS. 13B and 13C were generated with the fiber amplifier computer code numerical simulator developed by Wagener that is mentioned above. In FIG. 13B, the mean wavelength difference $\Delta$ for the output $ASE_1$ (on the left side of the EDF 118' in FIG. 13A) is plotted as a function of the pump power $P_2$ launched into the EDF by the second pump source 1420, for constant pump power $P_1$ of 30 mW. The mean wavelength difference $\Delta$ is expressed in ppm, i.e., $\Delta$ is normalized to the average of the mean wavelengths of the two polarizations. The various curves were computed for different lengths of EDF, namely 2 m, 4 m, 6 m, and 8 m. As predicted from physical considerations above, as the power $P_2$ is increased from below $P_1=30$ mW to above 30 mW, the mean wavelength difference $\Delta$ goes from negative to positive for all lengths of the EDF 118'. Thus, for each of the fiber lengths modeled there is a finite pump power $P_2$ that causes $\Delta$ to be zero. In all cases, this power is lower than the power $P_1$ launched by the first pump source (30 mW). FIG. 13B shows that by properly selecting the power launched by the second source 1420, the light emitted towards the first pump source 1410 can be made fully unpolarized.

In FIG. 13C, the output $ASE_2$ entering the coupler 110' is calculated for a $P_1$ of 30 mW. Once again, the mean wavelength a goes from negative to positive, and for each fiber length modeled, there is a finite pump power $P_2$ that causes $\Delta$ to be zero, which is higher than the power $P_1$ launched by the first pump source (30 mW). Thus, FIG. 13C shows that by properly selecting the power launched by the second source 1420, the light emitted towards the second pump source 1420 can be made fully unpolarized.

According to another embodiment of the invention, shifts in the mean wavelength of output from an SFS are substantially reduced by fixing the state of polarization of the optical pump source and using polarization-maintaining (PM) fibers throughout the fiber source. This differs from the prior art (see, for example, U.S. Pat. No. 5,701,318 to Digonnet, et al.) because all the optical components discussed in the instant application are polarization maintaining, and not just the erbium-doped fiber.

Figure 14A:
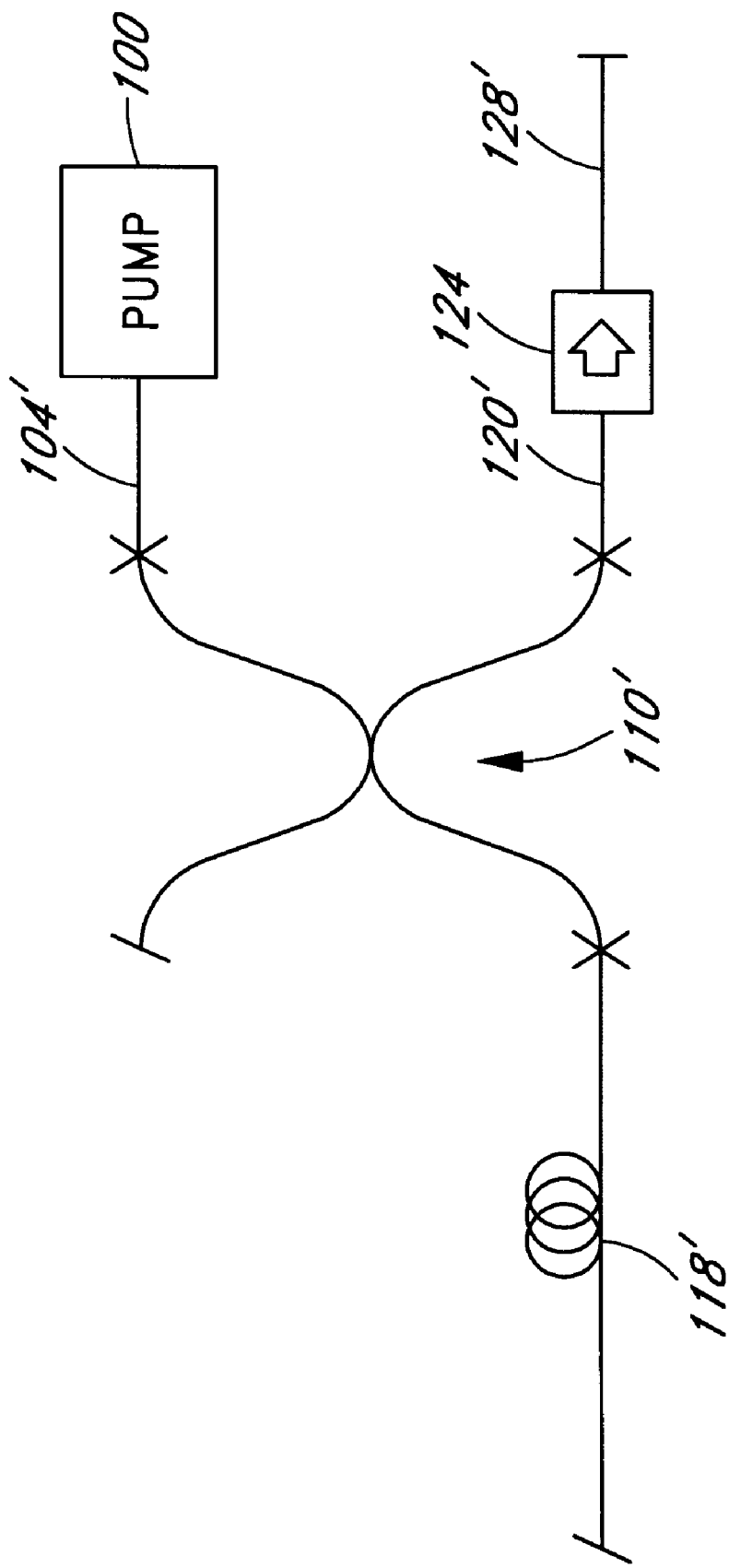
FIG. 14A shows an embodiment for producing a stable spectrum and mean wavelength from a superfluorescent fiber source (backward configuration) that utilizes polarization maintaining optical components.

One example of such an embodiment is illustrated in FIG. 14A, in which the primed components function much like their analogous unprimed components of FIG. 3, except that the primed components (the output pigtail 104', the optical coupler 110', the doped fiber 118', and the isolator pigtails 120' and 128') are all polarization maintaining. In this embodiment, the output from the optical pump source 100 (which is preferably a laser diode) is launched along one of the fiber axes of pigtail 104'. Consequently, the pump and the superfluorescent signal remain aligned with those axes regardless of environmental conditions. However, this embodiment requires careful alignment of the fiber axes of adjacent fiber optic components as those components are spliced together. In this embodiment, the two eigenpolarizations at the output of the SFS carry slightly different spectra, because of polarization dependent gain, but these two spectra are independent of external perturbation of the fiber birefringence, so that the spectrum (which may be input to a gyroscope), as well as the spectrum mean wavelength, are stable.

Figure 14B:
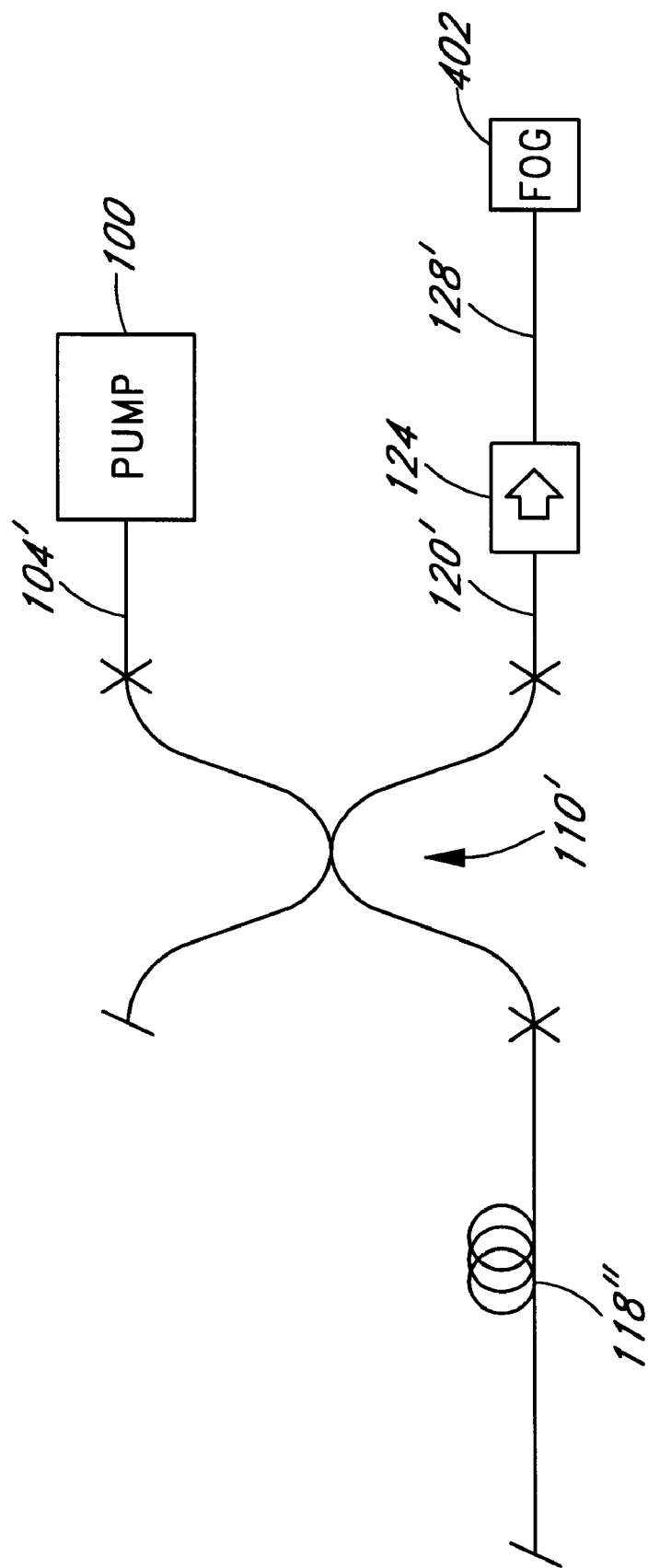
FIG. 14B shows a fiber optic gyroscope embodiment based on the polarization maintaining design of FIG. 14A.
Figure 14C:
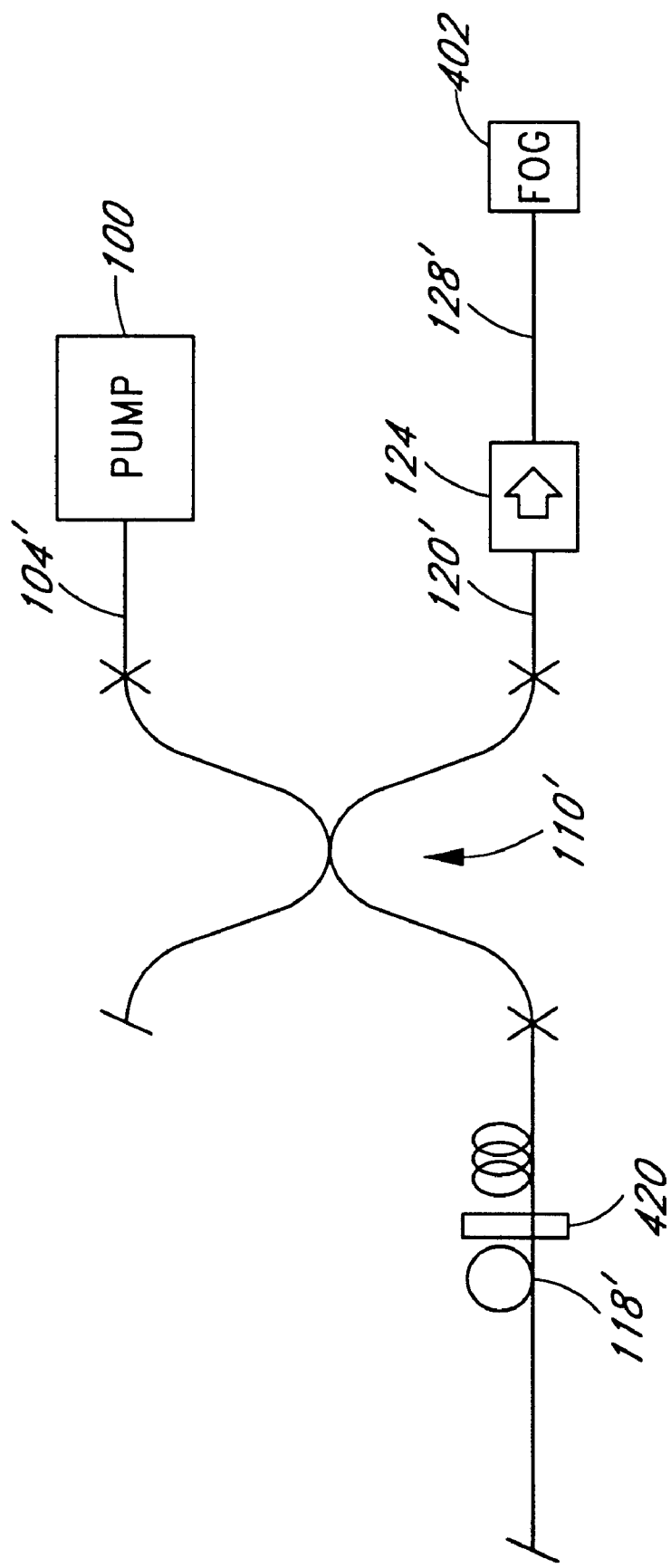
FIG. 14C shows a fiber optic gyroscope embodiment similar to that of FIG. 14B, except that a polarizer has been added to the superfluorescent fiber.

FIG. 14B illustrates an embodiment in which the doped fiber 118" comprises a single-polarization fiber. Careful alignment of the fiber 128' with respect to an input polarizer (not shown) within the fiber optic gyroscope 402 is required. Alternatively, an additional polarizer 420 may be positioned within the fiber 118', as indicated in FIG. 14C. The optimum location of the additional polarizer 420 can be calculated in accordance with U.S. Pat. No. 5,701,318 to M. Digonnet et al., which is incorporated by reference herein. The single-polarization fiber embodiment and the embodiment of FIG. 14C produce superfluorescent outputs that are essentially linearly polarized, but with a power that is nominally the same as an unpolarized configuration. Thus, with the embodiment of FIG. 14C, for example, the power delivered through the input polarizer of the fiber optic gyroscope 402 is effectively doubled.

In FIGS. 14A, 14B, and 14C, the polarization state of light traveling throughout the fiber (118', 118") is frozen with polarization-maintaining or single-polarization fiber, and the problem of pump polarization drift that prevails in non-polarization maintaining SFSs is substantially eliminated.

Figure 15:
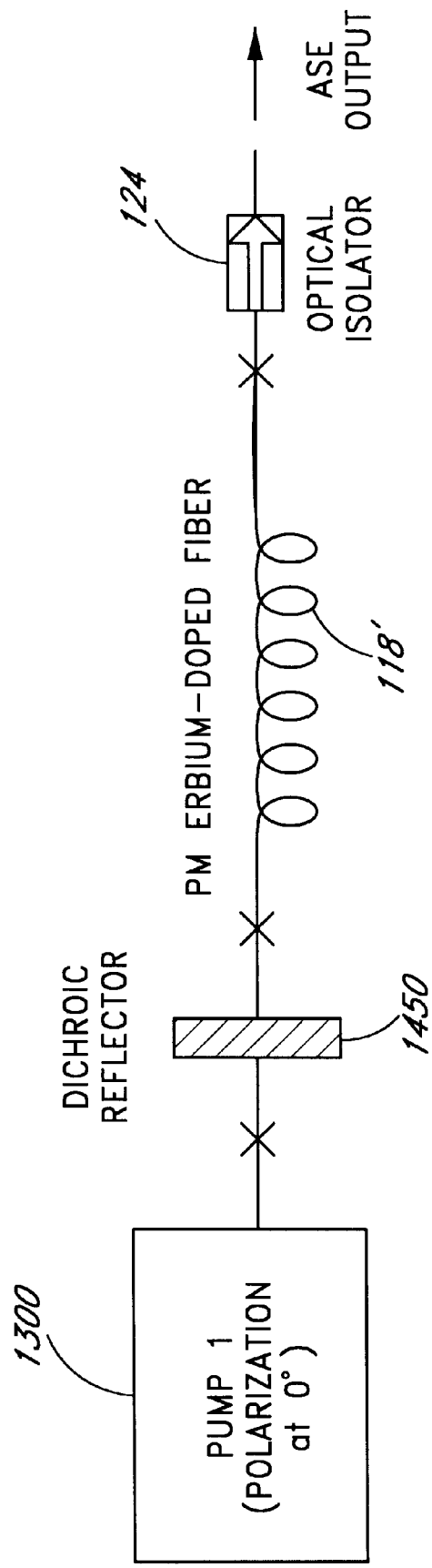
FIG. 15 shows a double pass configuration for reducing the pump polarization dependence of the source mean wavelength, which utilizes polarization maintaining components.

A double-pass configuration which utilizes polarization maintaining components is shown in FIG. 15. In this embodiment, the WDM coupler 110' of FIGS. 14A–C is replaced with a dichroic reflector 1450 which is positioned between the pump source 1300 and the EDF 118'. The light emitted by the pump source 1300 is linearly polarized and launched along either one of the two birefringence axes of the PM erbium-doped fiber 118'. An optical isolator 124 is placed at the output end of the erbium-doped fiber 118' to prevent reflected light (for example, from an optical system into which the output from the EDF 118' is coupled) from causing the EDF to oscillate. The isolator 124 is advantageously made with PM fiber, and its birefringence axes are aligned with the birefringence axes of the erbium-doped fiber 118' in order to preserve the polarization of the output light. By eliminating the need for a WDM coupler, the cost of the device is reduced, and a shorter fiber 118' and a lower pump power is required than the embodiment of FIG. 14A. When the embodiment of FIG. 15 is used as a light source for a fiber optic gyroscope, its output polarization should be aligned with the polarizer at the input of the gyroscope circuit.

Figure 16:
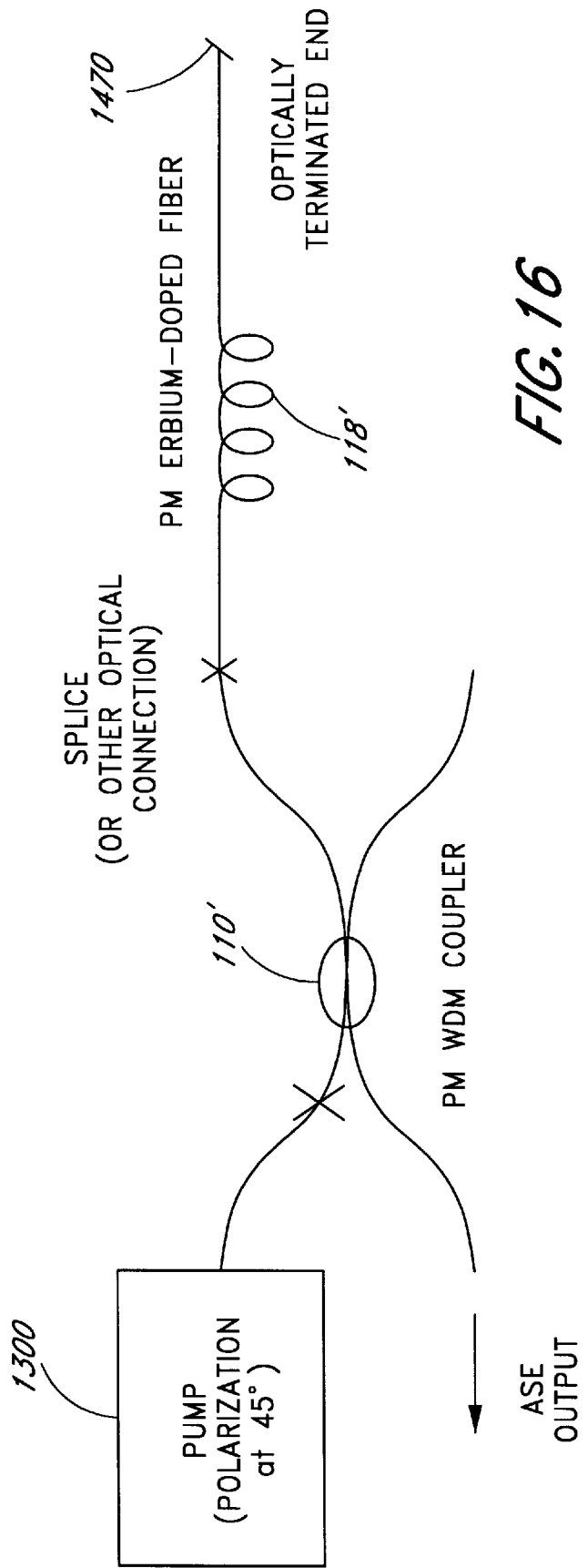
FIG. 16 shows a backward source configuration for reducing the pump polarization dependence of the source mean wavelength, which utilizes polarization maintaining components and a WDM coupler whose birefringence axes are aligned at 45 degrees to the polarization of the pump.

A backward output configuration utilizing PM fibers is shown in FIG. 16. The main difference between this embodiment and the configuration of FIG. 14A is that the output pigtail 1464 of the PM WDM coupler 110' is coupled (e.g., spliced) to the PM erbium doped fiber 118' so that the birefringence axes of the PM WDM coupler 110' are aligned at 45 degrees with respect to the birefringence axes of the PM erbium-doped fiber. Upon exiting the WDM coupler 110', the pump light enters the PM erbium-doped fiber 118'. As in the case of FIG. 14A, one end 1470 of the pump output end of the EDF 118' of FIG. 16 is optically terminated, e.g., by polishing or cleaving the fiber end at an angle or splicing it to a coreless fiber, or by coupling it to an optical isolator (not shown).

Since the pump light is launched with equal power into the birefringence axes of the EDF 118', the state of polarization (SOP) of the pump light varies periodically along the EDF 118', with a period $L_b$ that depends on the fiber birefringence but that is typically in the range of a few mm or less. Similarly, the SOP of every frequency component of the ASE signal traveling in the fiber 118' also varies periodically along the EDF 118', with a period $L_b'$ that is different from $L_b$ (primarily because the pump and the signal have different wavelengths). Thus, at some periodic locations along the EDF 118', the pump light and a given frequency component of the ASE signal have parallel (linear or circular) polarizations, while at other, likewise periodic locations along the EDF 118', the pump light and the given frequency component of the ASE signal have orthogonal (linear or circular) polarizations. If the period is short enough, namely much shorter than the length of the fiber 118', this given frequency component will experience gain due to pump light that is polarized alternately parallel and orthogonal to this frequency component. Consequently, the variations in gain arising from variations in the polarization of the pump light along the EDF 118' are averaged out, and this given frequency component of the ASE signal does not experience PDG. Since this argument holds for every frequency component of the broadband ASE signal, the source of FIG. 16 does not experience PDG, and the device of FIG. 16 emits broadband ASE light having the same mean wavelength for all polarizations.

Figure 17:
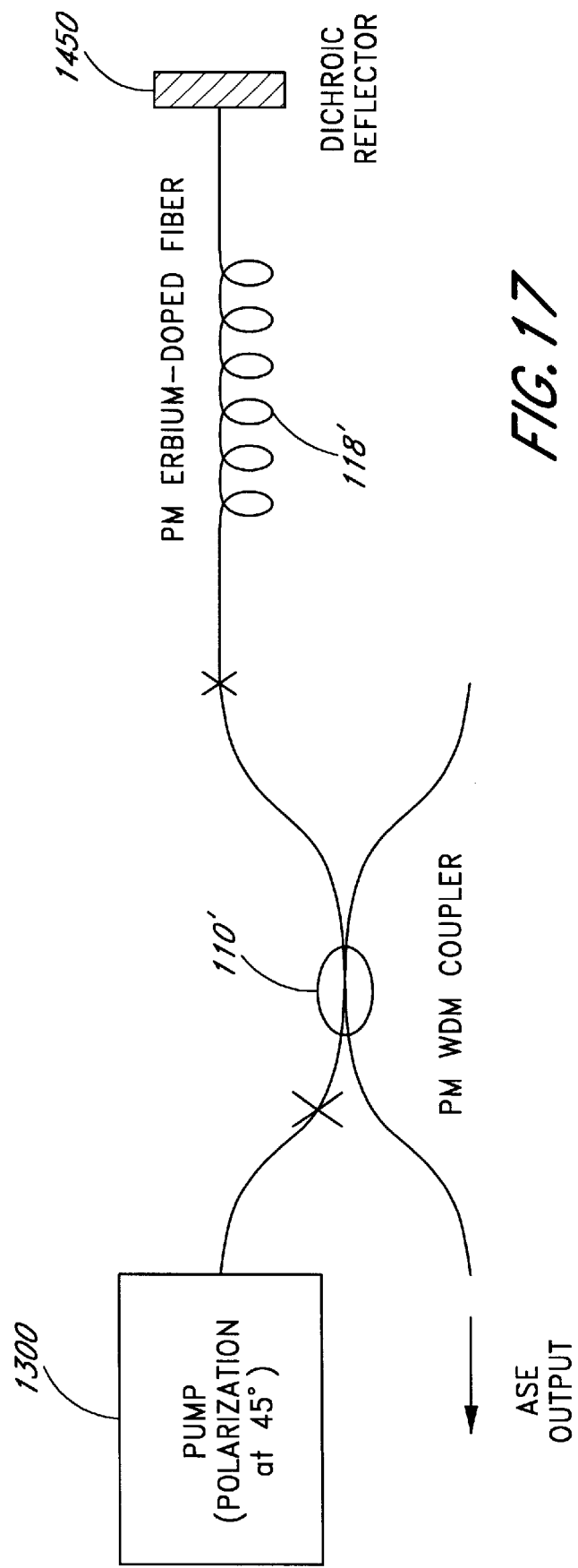
FIG. 17 shows a double pass source configuration for reducing the pump polarization dependence of the source mean wavelength, which utilizes polarization maintaining components and a WDM coupler whose birefringence axes are aligned at 45 degrees to the polarization of the pump.

This principle can be extended to a double-pass source configuration by adding a dichroic reflector 1450 at the pump output end of the EDF 118'. As illustrated in FIG. 17, an advantage of such a configuration over the one of FIG. 16 is that the double-pass feature of FIG. 17 permits a lower pump power and a shorter length of erbium-doped fiber 118'. If need be, an optical isolator (not shown) can advantageously be placed between the pump source 1300 and the WDM coupler 110' in order to prevent lasing of the EDF 118' resulting from optical feedback between the dichroic reflector 1450 and optics in the laser 1300 (e.g., the output facet of a semiconductor laser.) Another double-pass embodiment is shown in FIG. 18, in which a dichroic reflector 1450 is placed between the pump source 1300 and the EDF 118', thereby eliminating the need for a WDM coupler and reducing the cost of the device.

Figure 19:
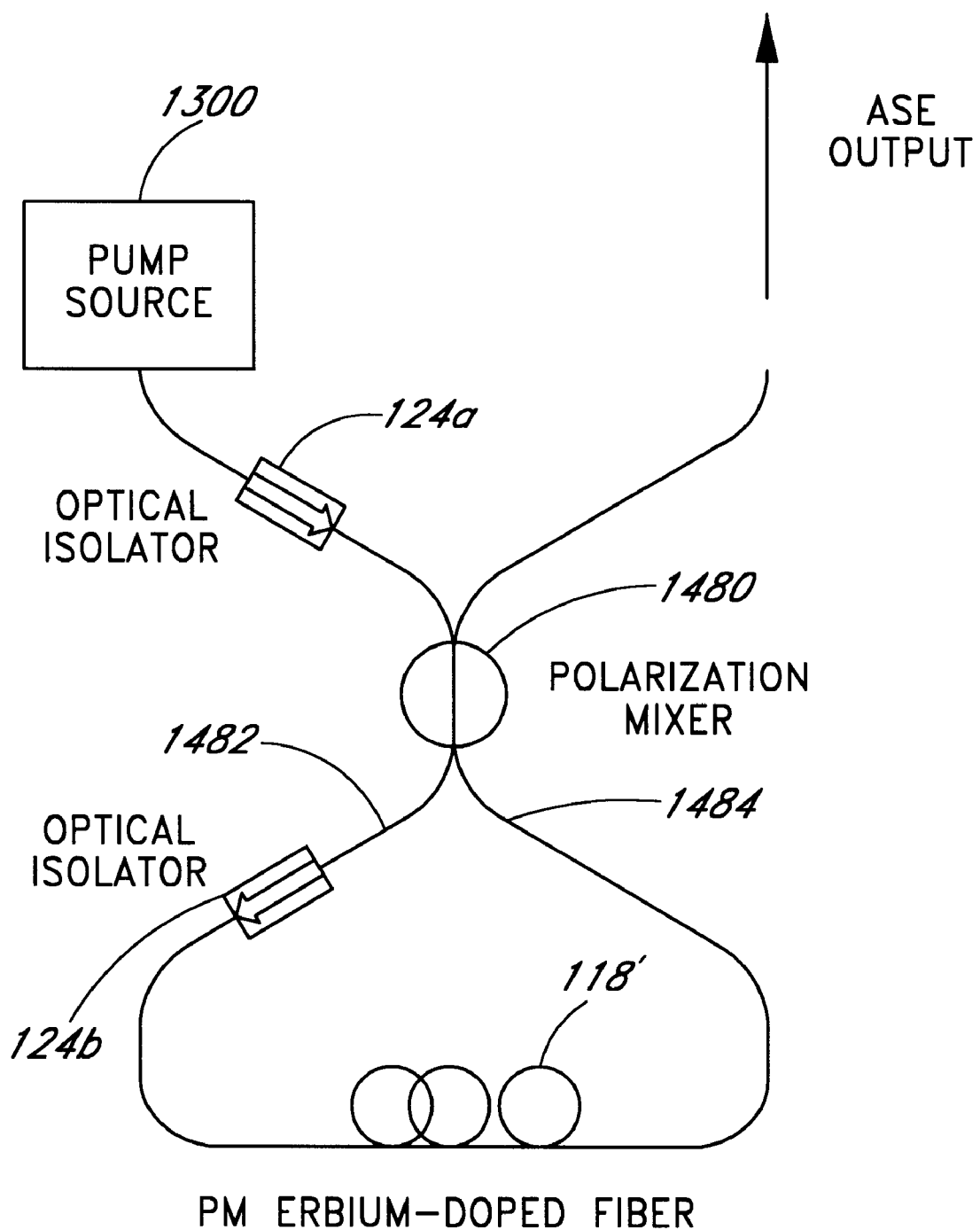
FIG. 19 shows a configuration for reducing the pump polarization dependence of the superfluorescent source mean wavelength which utilizes a single pump source.

FIG. 19 shows another SFS embodiment whose output has a mean wavelength that is stable with respect to variations in pump polarization and environmental perturbations of the circuit fiber. All of the optical components of FIG. 19 are advantageously made from PM fiber. Unlike the embodiment of, for example, FIG. 13A, the embodiment shown in FIG. 19 utilizes one rather than two pump sources. Linearly polarized light from a pump source 1300 is sent through a first optical isolator 124a into a WDM polarization coupler 1480, which directs the pump light to one of two output ports 1482, 1484. The polarization coupler 1480 operates such that (1) a certain fraction of the pump light incident upon the mixer 1480 is coupled to the left output port 1482, with this fraction of the pump light having a power $P_1$ and a polarization that is linear, e.g., in the plane of FIG. 19; and (2) the remaining pump light is coupled to the right output port 1484, and has a power $P_2$ and a linear polarization that is orthogonal to the light entering the left output port 1482, i.e., perpendicular to the plane of FIG. 19 in this example. Thus, the EDF 118' is pumped bidirectionally by pump signals that are orthogonally polarized with respect to each other. The coupling ratio of the mixer 1480, i.e., the ratio $P_2/(P_1+P_2)$, is selected so that the ASE output from the right side of the EDF 118' has a $\Delta$ of 0 (i.e., a mean wavelength that does not vary with the polarization of the pump light), in accordance with the methodology discussed in connection with FIGS. 13A, B, and C. The polarization mixer 1480 should be such that it couples nominally 0% of the ASE signal in a polarization dependent manner. In this case, the ASE output from the left hand side of the EDF 118' will in general have a non-zero $\Delta$, but a second optical isolator 124b prevents this signal from reaching the mixer 1480, which would otherwise leak through the mixer 1480 and combine with the ASE output from the right side of the EDF 118' to produce an undesirably phase sensitive output spectrum having a non-zero $\Delta$.

One advantage of the embodiment of FIG. 19 is that only a single pump source 1300 is required. This results in lower cost and avoids a problem that may arise when two pump sources are used, namely, the pump sources may "age" at different rates. If, in the embodiment of FIG. 13A, for example, the output powers of the two pump sources 1410 and 1420 deteriorate over time at different rates, then $\Delta$ will vary over time. On the other hand, as the pump source 1300 in the embodiment of FIG. 19 ages, both $P_1$ and $P_2$ will drop over time, but their ratio will remain unchanged which tends to mitigate any changes in $\Delta$.

Figure 18:
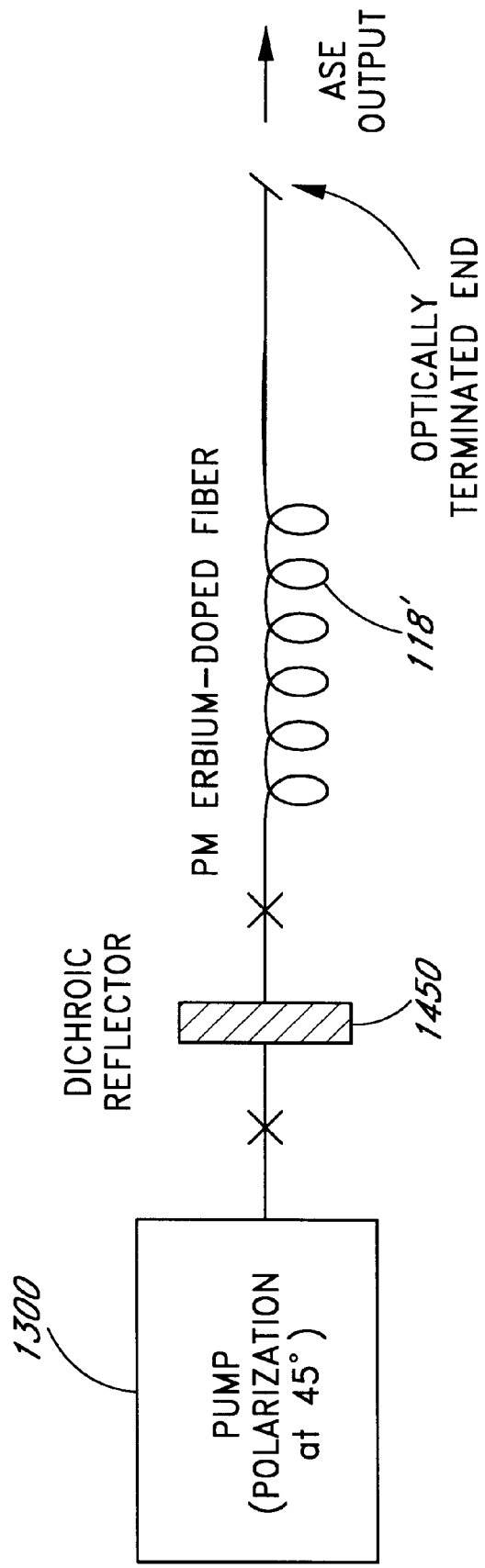
FIG. 18 shows another double pass source configuration for reducing the pump polarization dependence of the source mean wavelength, which utilizes polarization maintaining components and a WDM coupler whose birefringence axes are aligned at 45 degrees to the polarization of the pump.

A further embodiment of the invention is based on the same principle as FIGS. 16, 17, and 18. The EDF still exhibits a strong birefringence, but this time the EDF is made of a standard, low-birefringence fiber (i.e., a non-PM fiber) and the birefringence is induced by bending the EDF around a mandrel with a small enough diameter. The resulting EDF coil exhibits a linear birefringence with two proper axes, one perpendicular to the plane of the coil and the other one parallel to the plane of the coil. The polarized pump is launched into the coil with its polarization such that equal power is launched into each of these axes. As in the embodiment of FIG. 16, for example, because the beat length of this birefringent coil depends on wavelength, the polarization of the pump and the polarization of the ASE signal evolve periodically along the fiber, with different periods. Consequently, the ASE signal overlaps periodically with a pump that is orthogonal to it, then parallel to it, which reduces PDG. For the reduction in PDG to be substantial, the beat length must be short compared to the strong-signal absorption length of the EDF, i.e., the bending radius must be small enough. Another embodiment of the same concept is to wrap the fiber in a coil, but also twist the fiber on itself.

Although preferred embodiments of the present invention have been described in detail above, it will be understood by those of ordinary skill in the art that certain obvious modifications and departures from the embodiments described herein can be made without departing from the spirit or essential characteristics of the invention. For example, in the embodiments disclosed herein, it is understood that some or all of the optical components that make up the embodiments can be replaced by equivalent integrated optic components performing the same function, including, but not limited to, the polarization-maintaining fibers, the depolarizers, the fiber couplers, the isolators, and the erbium-doped fibers. An erbium-doped fiber can be replaced by an integrated optic waveguide based on silica or other materials, having an appropriate length and erbium concentration. As another example, the fiber couplers disclosed herein may be constructed with integrated optic waveguides using well-known technology. Care should be taken to design this coupler so that it exhibits the appropriate properties, e.g., Type II polarization dependence.

What is claimed is:

1. A superfluorescent source, comprising:
   an optical pump source generating optical radiation that is substantially unpolarized; and
   a solid state laser medium that is pumped by the substantially unpolarized optical radiation, said medium having characteristics selected to generate superfluorescence having a full width at half maximum (FWHM) of at least 2 nm and a mean wavelength that is stable to within 50 ppm against polarization fluctuations in said superfluorescent source.

2. The superfluorescent source of claim 1, wherein the superfluorescence from said medium is generated by rare earth ions.

3. The superfluorescent source of claim 1, wherein the superfluorescence from said medium is generated by erbium ions.

4. The superfluorescent source of claim 3, comprising an optical coupling element that couples the optical radiation to said medium.

5. The superfluorescent source of claim 4, wherein said optical coupling element is a wavelength division multiplexing (WDM) coupler.

6. The superfluorescent source of claim 1, comprising an isolator to reduce optical feedback.

7. The superfluorescent source of claim 3, further comprising a fiber optic gyroscope, wherein the superfluorescence of said superfluorescent source is input into said gyroscope.

8. The superfluorescent source of claim 3, wherein said optical pump source comprises:
   a laser; and
   a depolarizer.

9. The superfluorescent source of claim 8, wherein said depolarizer is a Lyot depolarizer.

10. The superfluorescent source of claim 8, wherein said depolarizer includes a PZT modulator.

11. The superfluorescent source of claim 8, further comprising a second depolarizer on the output side of said laser medium.

12. The superfluorescent source of claim 1, wherein the superfluorescence has a mean wavelength that is stable to within 3 ppm against fluctuations in said superfluorescent source.

13. The superfluorescent source of claim 8, wherein said laser includes a laser diode.

14. The superfluorescent source of claim 1, wherein said solid state medium comprises an optical waveguide.

15. The superfluorescent source of claim 1, wherein said solid state medium comprises an optical fiber.

16. The superfluorescent source of claim 1, wherein the mean wavelength is stable to within 50 ppm against birefringence changes in said superfluorescent source.

17. The superfluorescent source of claim 1, wherein the mean wavelength is stable to within 50 ppm against polarization changes of the optical radiation from said optical pump source.

18. The superfluorescent source of claim 1, said optical pump source comprising a plurality of pumps, said plurality of pumps having outputs with polarizations selected such that the optical radiation from said optical pump source is substantially unpolarized.

19. The superfluorescent source of claim 18, wherein said plurality of pumps includes two pumps whose respective optical outputs are combined so that the polarizations of the outputs are orthogonal to each other.

20. A superfluorescent source, comprising:
   an optical pump source generating optical radiation that is substantially unpolarized; and
   a solid state laser medium that is pumped by the substantially unpolarized optical radiation, said medium having characteristics selected to generate superfluorescence having a full width at half maximum (FWHM) of at least 2 nm and a mean wavelength that is stable to within 50 ppm against polarization changes in said source that range over the Poincaire sphere.

21. A superfluorescent source, comprising:
   an optical pump source generating optical radiation that is substantially unpolarized, said optical pump source including:
      a plurality of pumps that generate respective optical outputs;
      a polarization mixer that receives the respective optical outputs from said plurality of pumps and generates optical output, wherein the respective optical outputs from said plurality of pumps have polarizations selected such that optical output from said mixer is substantially unpolarized; and
      a depolarizer that receives the optical output from said polarization mixer; and
   a solid state laser medium that is pumped by the output from said depolarizer, said medium having characteristics selected to generate superfluorescence having a full width at half maximum (FWHM) of at least 2 nm and a mean wavelength that is stable against polarization fluctuations in said superfluorescent source.

22. The superfluorescent source of 21, further comprising a dichroic reflector between said depolarizer and said medium.

23. The superfluorescent source of claim 21, wherein the mean wavelength is stable to within 500 ppm against polarization fluctuations in said superfluorescent source.

24. The superfluorescent source of claim 21, wherein the mean wavelength is stable to within 100 ppm against polarization fluctuations in said superfluorescent source.

25. The superfluorescent source of claim 21, wherein the mean wavelength is stable to within 50 ppm against polarization fluctuations in said superfluorescent source.

26. The superfluorescent source of claim 21, wherein the mean wavelength is stable to within 3 ppm against polarization fluctuations in said superfluorescent source.

27. The superfluorescent source of claim 21, wherein said plurality of pumps includes two pumps having respective optical outputs combined so that the polarizations of the outputs are orthogonal to each other.

28. The superfluorescent source of claim 21, wherein the superfluorescence from said medium is generated by erbium ions.

29. The superfluorescent source of claim 21, wherein the superfluorescence from said laser medium is generated by rare earth ions.

30. The superfluorescent source of claim 21, comprising an isolator to reduce optical feedback.

31. The superfluorescent source of claim 21, further comprising a fiber optic gyroscope, wherein the superfluorescence of said superfluorescent source is input into said gyroscope.

32. The superfluorescent source of claim 21, wherein said plurality of pumps comprise lasers.

33. The superfluorescent source of claim 21, wherein said depolarizer is a Lyot depolarizer.

34. The superfluorescent source of claim 21, wherein said depolarizer includes a PZT modulator.

35. The superfluorescent source of claim 21, wherein said solid state medium comprises an optical waveguide.

36. The superfluorescent source of claim 21, wherein said solid state medium comprises an optical fiber.

37. The superfluorescent source of claim 21, wherein the mean wavelength is stable to within 500 ppm against birefringence changes in said superfluorescent source.

38. The superfluorescent source of claim 21, wherein the mean wavelength is stable to within 500 ppm against polarization changes of the optical radiation from said optical pump source.

39. The superfluorescent source of claim 21, further comprising a dichroic reflector between said depolarizer and said medium, said reflector reflecting backward traveling optical radiation from said medium back through said medium.

40. A method of generating superfluorescence, comprising:

providing a plurality of optical pumps, the pumps having respective optical outputs with different polarizations;

directing the respective optical outputs through a polarization mixer that produces optical output, wherein the different polarizations are selected so that the optical output from the mixer is substantially unpolarized;

depolarizing the output from the mixer;

injecting the depolarized output into a solid state laser medium; and producing superfluorescence from the medium that has a mean wavelength that is stable against polarization fluctuations in the superfluorescent source.

41. The method of claim 40, wherein the wavelength is stable to within 500 ppm against polarization fluctuations in said superfluorescent source.

42. The method of claim 40, wherein the superfluorescence has a full width at half maximum (FWHM) of at least 2 nm.

43. The method of claim 40, wherein said depolarizing includes directing the output from the mixer through a depolarizer.

44. The method of claim 40, wherein the plurality of optical pumps includes two pumps having respective optical outputs whose polarizations are orthogonal to each other.

45. The method of claim 40, wherein the solid state medium includes rare earth ions.

* * * * *